US012543045B2

(12) United States Patent
Zhu et al.

(10) Patent No.: US 12,543,045 B2
(45) Date of Patent: Feb. 3, 2026

(54) BIOMETRIC ACTIVITY BASED PAIRING PROTOCOLS FOR WEARABLE DEVICES

(71) Applicants: Ye Zhu, Westlake, OH (US); Jafar Pourbemany, Cleveland, OH (US)

(72) Inventors: Ye Zhu, Westlake, OH (US); Jafar Pourbemany, Cleveland, OH (US)

(73) Assignee: Cleveland State University, Cleveland, OH (US)

( * ) Notice: Subject to any disclaimer, the term of this patent is extended or adjusted under 35 U.S.C. 154(b) by 255 days.

(21) Appl. No.: 18/160,022

(22) Filed: Jan. 26, 2023

(65) Prior Publication Data

US 2023/0239698 A1    Jul. 27, 2023

Related U.S. Application Data

(60) Provisional application No. 63/303,097, filed on Jan. 26, 2022.

(51) Int. Cl.
*H04W 12/50* (2021.01)
*H03M 13/15* (2006.01)
*H04L 9/40* (2022.01)
*H04W 12/06* (2021.01)
*H04W 12/69* (2021.01)

(52) U.S. Cl.
CPC ......... *H04W 12/50* (2021.01); *H03M 13/152* (2013.01); *H04L 63/062* (2013.01); *H04W 12/06* (2013.01); *H04W 12/69* (2021.01)

(58) Field of Classification Search
CPC ... H04W 12/50; H04W 12/06; H04W 12/065; H04W 12/08; H04W 12/33; H04W 12/37; H04W 12/40; H04W 12/69
See application file for complete search history.

(56) References Cited

U.S. PATENT DOCUMENTS

| | | | |
|---|---|---|---|
| 8,812,864 B2 * | 8/2014 | Adams | G06Q 20/40145 |
| | | | 713/186 |
| 10,404,695 B2 * | 9/2019 | Jang | H04L 63/0428 |
| 10,708,777 B2 * | 7/2020 | Kim | H04W 12/04 |
| 11,057,378 B2 * | 7/2021 | Shim | G06F 21/32 |
| 11,070,376 B2 * | 7/2021 | Uy | H04L 9/0866 |
| 11,579,694 B2 * | 2/2023 | Kaehler | G06V 10/235 |
| 11,847,652 B2 * | 12/2023 | Wagner | H04L 9/0866 |
| 2023/0157545 A1 * | 5/2023 | KoKovidis | H04W 12/50 |
| | | | 600/301 |

* cited by examiner

*Primary Examiner* — Hosuk Song
(74) *Attorney, Agent, or Firm* — Renner, Kenner, Greive, Bobak Taylor & Weber Co., L.P.A.

(57) ABSTRACT

The present invention teaches a method of pairing two user worn devices including collecting first and second biometric activity from respective first and second user worn devices to create first and second biometric signals, processing the first and second biometric signals to create first and second keys and determining if the keys match to allow for pairing of the two user worn devices. The first and second biometric activity may be the same or different biometric activities. The processing of the biometric signals is adjusted based upon the types of biometric activities being sensed.

20 Claims, 28 Drawing Sheets

BIOMETRIC ACTIVITY BASED PAIRING PROTOCOLS FOR WEARABLE DEVICES

CROSS-REFERENCE TO RELATED APPLICATIONS

This application claims the benefit of U.S. Provisional Patent Application Serial Number U.S. 63/303,097 filed Jan. 26, 2022, which is incorporated herein by reference in its entirety.

FIELD OF THE INVENTION

The present invention relates protocols for shared-key generation and pairing of wearable devices. In some embodiments, the present invention specifically relates to the use of the wearer's biometric activity to create a shared key. In some embodiments, the present invention more specifically relates to the use of the wearer's respiration activity to be able to pair wearable devices utilizing different types of sensors. In some embodiments, the present invention specifically relates to the use of the wearer's respiratory and cardiac activity to create a shared key.

BACKGROUND OF THE INVENTION

Wearable devices have become remarkably popular in many fields, such as health care, health management, the workplace, education, and scientific research. Nowadays, there are hundreds of various products in the market, including smartwatches, smart wristbands, smart glasses, smart jewelry, smart straps, smart clothes, smart belts, smart shoes, smart gloves, skin patches, and even implanted medical devices (IMD). These products are utilized in a variety of applications. For example, they can monitor vital signs like heart rate, respiratory rate, body temperature, blood pressure, blood oxygen, and blood glucose while also utilizing these vital signs in order to detect disorders.

Wearable devices can collect a wide range of information about human activities and behaviors. They usually sense, analyze, and store data based on the needs of their applications. In many cases, they need to share data with a base station or other wearable devices. Data shared between wearable devices is usually sensitive. Examples are health data or commands to adjust an implanted medical device. Therefore, the communication between wearables should be protected by encryption, and the devices need to have a shared secure key for encryption to ensure that an attacker cannot compromise the process.

Traditional pairing techniques either need user intervention or implicitly rely on device proximity. A common approach that is based on user intervention is Bluetooth® pairing, which requires selecting a target device from the list of available devices with/without an additional PIN requirement. PIN-based methods need interaction with some sort of input device or display, which may be either inconvenient or impossible in many wearables. Furthermore, PIN-based pairing is vulnerable to observation attacks such as shoulder surfing. Public key cryptography (PKC), on the other hand, cannot be used to create a secure key on wearable devices because it requires a public key infrastructure (PKI). In addition, expensive computing methods such as PKC are not suitable for resource-limited Internet of Things (IoT) devices. Various techniques have been proposed to mitigate these limitations that take advantage of common features in the different wearable devices.

Proximity-based pairing, such as NFC or RFID, require a tightly controlled transmission range in order to avoid relay attacks. Pairing based on observation of a biometric activity is a natural choice because wearable devices are attached to the same body. Both behavioral biometrics (e.g., gait) and physiological biometrics (e.g., heart rate and muscle activity) are used for wearable device pairing and authentication. In recent years, various biometric-based pairing techniques have been provided that exploit a variety of sensors such as accelerometers, gyroscopes, magnetometers, ECG sensors, PPG sensors, EMG sensors, and piezo sensors, among others. Therefore, there is a need in the art for a new method of utilizing biometric activity to pair wearable devices.

SUMMARY OF THE INVENTION

An embodiment of the present invention provides a method of pairing two user worn devices comprising collecting first biometric activity from a first device utilizing a first sensing mechanism to create a first biometric signal, collecting second biometric activity from a second device utilizing a second sensing mechanism to create a second biometric signal, processing the first biometric signal to create a first key, processing the second biometric signal to create a second key, and determining if the first key matches the second key to allow said first device to pair with said second device.

Another embodiment of the present invention provides a method of pairing two user worn devices as in any embodiment above, wherein the first biometric activity is different from the second biometric activity.

Another embodiment of the present invention provides a method of pairing two user worn devices as in any embodiment above, further comprising the step of determining an activity level based upon either the first biometric signal and the second biometric signal relative to reference values associated with the corresponding first biometric activity and second biometric activity.

Another embodiment of the present invention provides a method of pairing two user worn devices as in any embodiment above, further comprising the steps of selecting a model-based processing mode if the activity level is at a threshold value or greater, and selecting an extraction-based processing mode if the activity level is less than the threshold value.

Another embodiment of the present invention provides a method of pairing two user worn devices as in any embodiment above, wherein the step of processing the first biometric signal to create a first key according to the model-based processing mode includes the sub-steps of pre-processing the first biometric signal, quantizing the first biometric signal, performing mismatch correction of the first biometric signal, and generating the first key.

Another embodiment of the present invention provides a method of pairing two user worn devices as in any embodiment above, wherein the step of processing the second biometric signal to create a second key according to the model-based processing mode includes the sub-steps of pre-processing the second biometric signal, quantizing the second biometric signal, performing mismatch correction of the second biometric signal, generating the second key.

Another embodiment of the present invention provides a method of pairing two user worn devices as in any embodiment above, wherein the first biometric signal is a respiratory signal, wherein the second biometric signal is a cardiac signal, and wherein the sub-step of pre-processing the second biometric signal includes calculating an estimated respiratory signal.

Another embodiment of the present invention provides a method of pairing two user worn devices as in any embodiment above, wherein the activity level is less than the threshold and the steps of processing the first biometric signal to create a first key and the step of procession the second biometric signal to create a second key are model-based, and wherein the model-based step of processing the first biometric signal to create a first key includes the sub-steps of pre-processing the first biometric signal, quantizing the first biometric signal, performing mismatch correction of the first biometric signal, and generating the first key.

Another embodiment of the present invention provides a method of pairing two user worn devices as in any embodiment above, wherein the extraction-based step of processing the second biometric signal to create a second key includes the sub-steps of pre-processing the second biometric signal, extracting a first biometric signal proxy from the second biometric signal, calculating a first derivative of the first biometric signal proxy, optionally, calculating a second derivative of the first biometric signal proxy, quantizing the extracted first biometric signal proxy, performing mismatch correction of the extracted first biometric signal proxy, and generating the second key.

Another embodiment of the present invention provides a method of pairing two user worn devices as in any embodiment above, wherein the first biometric signal is a respiratory signal, wherein the second biometric signal is a cardiac signal, and wherein the sub-step of extracting a first biometric signal proxy from the second biometric signal includes extracting a respiratory signal proxy from the cardiac signal.

Another embodiment of the present invention provides a method of pairing two user worn devices as in any embodiment above, wherein the first biometric activity is the same as the second biometric activity.

Another embodiment of the present invention provides a method of pairing two user worn devices as in any embodiment above, wherein the first biometric activity and the second biometric activity are respiration activity.

Another embodiment of the present invention provides a method of pairing two user worn devices as in any embodiment above, wherein said step of processing the first biometric signal includes the sub-steps of pre-processing the first biometric signal, quantizing the first biometric signal, synchronizing the first biometric signal, performing mismatch correction of the first biometric signal, and generating the first key.

Another embodiment of the present invention provides a method of pairing two user worn devices as in any embodiment above, wherein said step of processing the second biometric signal includes the sub-steps of pre-processing the second biometric signal, quantizing the second biometric signal, synchronizing the second biometric signal, performing mismatch correction of the second biometric signal, and generating the second key.

Another embodiment of the present invention provides a method of pairing two user worn devices as in any embodiment above, wherein said first biometric signal has a first sample frequency, a first signal amplitude, and set of first noise characteristics; and wherein said second biometric signal has a second sample frequency, a second signal amplitude, and a set of second noise characteristics.

Another embodiment of the present invention provides a method of pairing two user worn devices as in any embodiment above, wherein the sub-step of pre-processing the first biometric signal further includes down-sampling the first sample frequency, normalizing of the first signal amplitude, and filtering of the first set of noise characteristics.

Another embodiment of the present invention provides a method of pairing two user worn devices as in any embodiment above, wherein the sub-step of pre-processing the second biometric signal further includes down-sampling the second ample frequency, normalizing of the second signal amplitude, and filtering of the second set of noise characteristics.

Another embodiment of the present invention provides a method of pairing two user worn devices as in any embodiment above, wherein the first sensing mechanism is selected from the group consisting of respiratory inductance plethysmography (RIP); accelerometer, anemometers, thermistors, thermocouples, pyroelectric detectors, fiber optic sensors, capacitive sensors, resistive sensors, microphones, nanocrystal and nanoparticles sensors; and wherein the second sensing mechanism is different or the same than the first sensing mechanism and is selected from the group consisting of respiratory inductance plethysmography (RIP); accelerometer, anemometers, thermistors, thermocouples, pyroelectric detectors, fiber optic sensors, capacitive sensors, resistive sensors, microphones, nanocrystal and nanoparticles sensors.

Another embodiment of the present invention provides a method of pairing two user worn devices as in any embodiment above, wherein the steps of processing the first biometric signal and the step of processing the second biometric signal each further includes sub-steps of segmenting said first biometric signal and said second biometric signal to create a segmented first biometric signal and a segmented second biometric signal, wherein the step of generating the first key includes selecting certain segments of the segmented first biometric signal, and wherein the step of generating the second key includes selecting certain segments of the segmented second biometric signal.

Another embodiment of the present invention provides a method of pairing two user worn devices as in any embodiment above, wherein the steps of processing the first biometric signal to create a first key further includes performing mismatch correction of the first biometric signal according to a modified BCH protocol, and wherein processing the second biometric signal to create a second key each further includes performing mismatch correction of the second biometric signal according to the modified BCH protocol.

Another embodiment of the present invention provides a method of pairing two user worn devices as in any embodiment above, wherein the first sensing mechanism is respiratory inductance plethysmography (RIP).

Another embodiment of the present invention provides a method of pairing two user worn devices as in any embodiment above, wherein the second sensing mechanism is selected from electrocardiogram (ECG) or photoplethysmogram (PPG).

BRIEF DESCRIPTION OF THE DRAWINGS

FIG. 8b shows a graph of the probability density function of the difference between the two signals of FIG. 8a;

DETAILED DESCRIPTION OF ILLUSTRATIVE EMBODIMENTS

Figure 1:
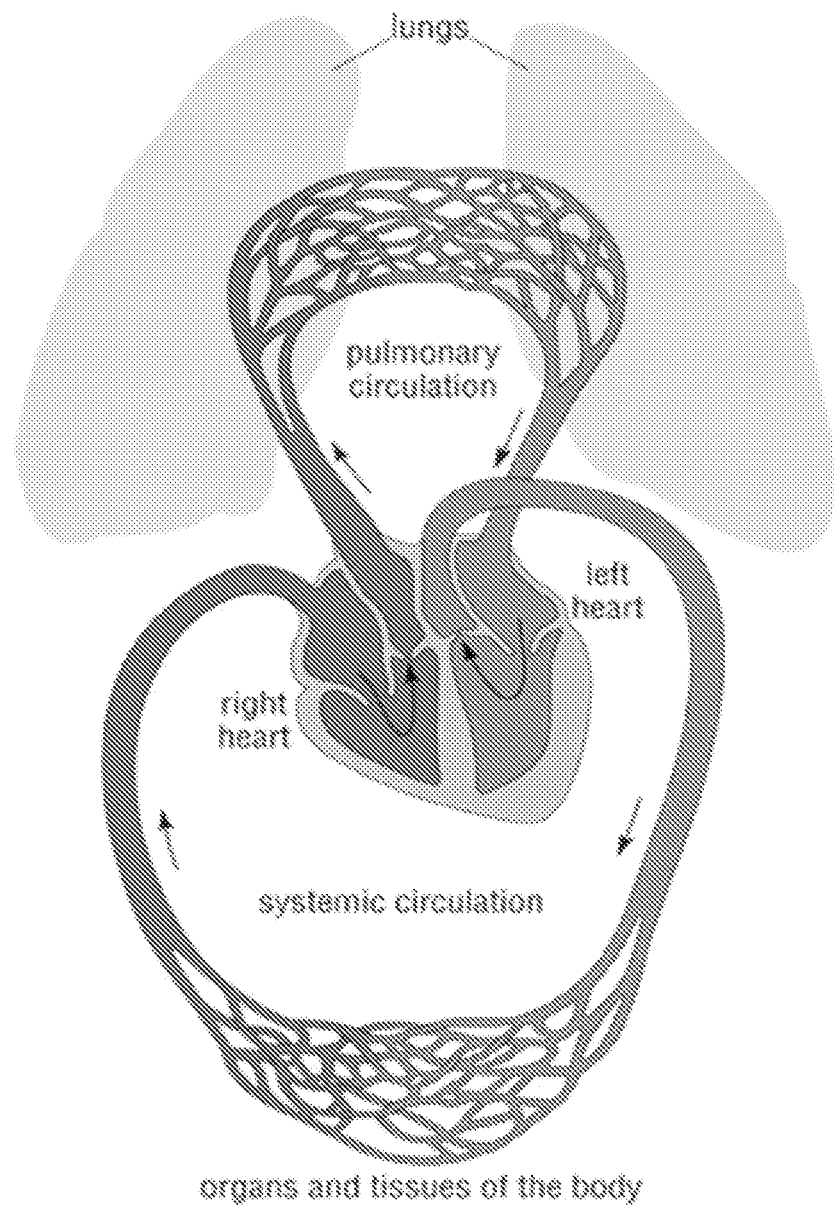
FIG. 1 shows a chart depicting the relationship between the lungs and the heart including the circular system where deoxygenated blood is pumped through the heart, oxygenated in the lungs, and then pumped to the organs and tissues of the body.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

The present invention utilizes the biometric activities of a user to generate a shared key so as to securely pair wearable devices. Specifically, the present invention provides methods allowing for the pairing of wearable devices regardless of the modality of the observed biometric activities, so long as the devices are worn on the same body. The fundamental differences in the variety of sensing mechanisms utilized by wearable devices makes the pairing of the devices difficult. One of the challenges is that the sampling rates used by the devices can be different due to the differences in the sensing mechanisms. The differences in the sensing mechanisms can cause big differences in the properties of signals collected from the wearable devices, such as signal amplitude. The dynamics of the signals collected from the wearable devices can be very different because of the differences in the sensing mechanisms (for example, a change in respiration such as tachypnea can bring very different changes in respiration signals collected with different sensing mechanisms). Thus, the key generation based on different sensing modalities is a challenging task. The present application uses the relationships that exist for observed biometric activities for the same body, regardless of whether the biometric activities being observed are of the same type of biometric activity.

The types of biometric activity suitable for the present are not particularly limited and one of ordinary skill in the art will be able to select suitable biometric activities without undue experimentation. Specifically, the types of suitable biometric activities can be selected based upon the selection of the wearable devices being paired. In various embodiments, wearable devices to be paired may include, without limitation, smart watches, fitness trackers, hearables such as earbuds, smart clothing such as smart shoes and smart shirts, smart jewelry such as smart rings and smart bracelets, head-mounted displays (HMD) such as AR/VR HMDs, smart glasses, exoskeletons, and implantable wearable devices (IMDs) such as pacemakers and defibrillators. In such devices, the types of integrated sensors with various sensing modalities may include, without limitation, PPG sensors in smart watches, ECG sensors in smart shirts, EMG sensors in smart armbands, RIP sensors in smart bras, EEG sensors in smart headbands, and IMUs in most of wearables. In various embodiments, suitable biometric activities may include, without limitation, respiratory activities, including respiratory rate, cardiac activities, including heartbeat characteristics such as heart rate variability (inter-beat interval and inter-pulse interval), movement, and gait. Other suitable biometric activities may include, without limitation, sleep, including sleep patterns, duration of different sleep stages (e.g. light sleep, deep sleep, REM sleep) and nocturnal awake time, stress including skin conductance and temperature, and hydration including analysis of sweat.

According to some embodiments of the present application, the breathing activity of a user is used to generate a shared key so as to securely pair wearable devices. One difficulty with using respiration as the underlying biometric activity for pairing is the variety of how different devices observe the respiration activity. The present application utilizes the observation of the respiration activity to generate the same key for a plurality of wearable devices that use different types of sensors. Furthermore, synchronization between signals collected by different devices (which is necessary for pairing) is difficult because of the differences in the sampling rates, signal properties, and dynamics.

According to some embodiments of the present application, the respiratory activity and cardiac activity of a user is used to generate a shared key so as to securely pair wearable devices. Fundamentally, the pairing is based on two different sensing modalities, and thus pairing requires understanding the relationships between respiratory signals and cardiac signals. Additionally, utilizing different methods of determining the relationship between respiratory signals and cardiac signals provides more than one pairing mode for which generation of a shared key is possible. Furthermore, selection of a pairing mode may be optimized according to the conditions under which the biometric activity is being collected. For example, one pairing mode may be better suited for a user performing a high degree of physical activity, whereas a different pairing mode may be better suited for a user who is at rest.

As shown in FIG. 1 the circulatory system links the lungs and the heart together in order to provide oxygen-rich blood for the human body to function properly. The circulatory system pumps deoxygenated blood from the right side of the heart to the lungs and transports oxygenated blood from lungs to different parts of body, as shown in FIG. 1. Heart rate is usually reasonably linear with respect to oxygen uptake (VO2), which is strongly correlated with minute ventilation (also known as VE, the amount of air that enters the lungs per minute) and respiration rate (RR).

Figure 5A:
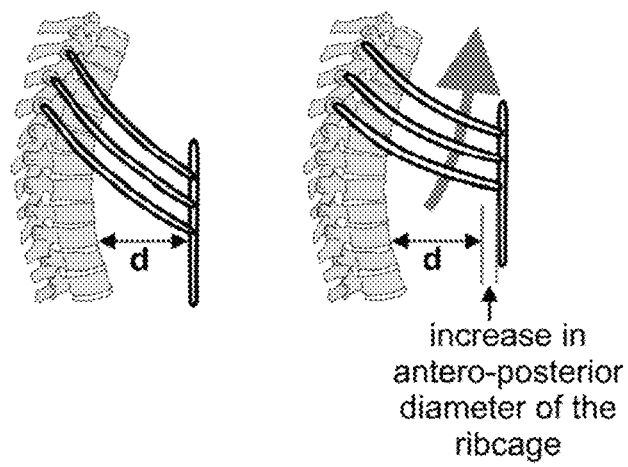
FIG. 5a shows the movement of a human rib cage during a breathing cycle.

A respiration cycle consists of inhalation and exhalation in which the lungs will be inflated or deflated via three muscles: the diaphragm, the sternocleidomastoid (SCM), and rib muscles (intercostal). During inhalation, the external intercostal contracts to bring out the rib cage, the SCM contracts to pull the rib cage upwards, and the diaphragm contracts and goes down to expand the thoracic cavity and increase the air volume in the lungs. During exhalation, the diaphragm relaxes and goes up, and the internal intercostal and abdominal muscles contract to make the lungs deflate back. The movement of the rib cage is shown in FIG. 5a. The normal breathing rate for a healthy adult human is 12-18 breaths per minute at rest. This rate varies based on age. For example, in infants, the average resting respiratory rate varies from 25 to 40 breaths per minute, while for seniors over 80 years old, the breathing rate is between 10 and 30 breath cycles per minute.

Continuous measurement of respiratory rate (RR) is necessary in fields such as healthcare and sports. A traditional approach to measuring respiratory rate and tidal volume (the volume of air inhaled and exhaled with each breath) measures the airflow using a flow meter. There are other approaches that use air features, such as air temperature, air humidity, air components, and respiratory sounds. In addition to airflow detection, the RR can be observed using chest and abdominal movement and other signals.

Figure 5B:
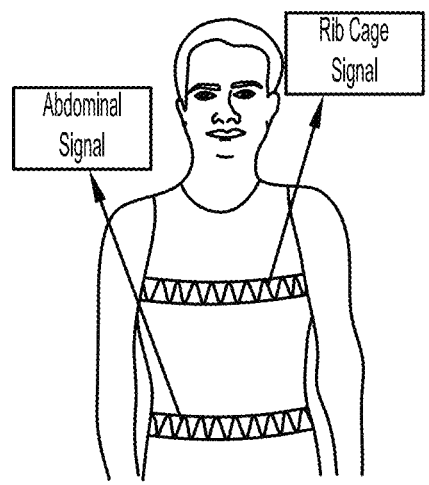
FIG. 5b shows the placement of respiratory inductance plethysmography bands on the chest and abdomen of a human.

Several respiratory measurement techniques have been developed based on detecting chest and abdominal movement. Respiratory inductance plethysmography (RIP) is a common method to measure pulmonary ventilation. RIP consists of two belts of sinusoidal wire coils positioned around the thorax and abdomen, as shown in FIG. 5b. The changes in the anteroposterior diameter of the abdomen and the rib cage during respiration change the coils' self-inductance and oscillation frequency. The latter is converted to a digital signal, the amplitude of which is proportional to the respiratory volume. A number of recent studies show the use of an accelerometer to detect the respiration signal based on the movement of the chest and abdominal wall. The main challenge of this method is the removal of motion artifacts.

Many other contact-based and noncontact-based techniques exist to measure respiration parameters. These techniques use a wide variety of sensors, such as anemometers, thermistors, thermocouples, pyroelectric detectors, fiber optic sensors, capacitive sensors, resistive sensors, microphones, nanocrystal and nanoparticles sensors, and many others. Given the wide variety of sensor mechanisms to observe respiration, it is unlikely in practice that two wearable devices use the same signal to observe respiration. This leads to the difficulties described above when using respiration for pairing. The pairing protocol of the present invention addresses these difficulties and enables effective pairing devices that use different sensor technologies to measure respiration. For example, a protocol design developed for a device that utilizes RIP and a device that utilizes an accelerometer can be directly applied to other combinations of sensing techniques as well.

Figure 5C:
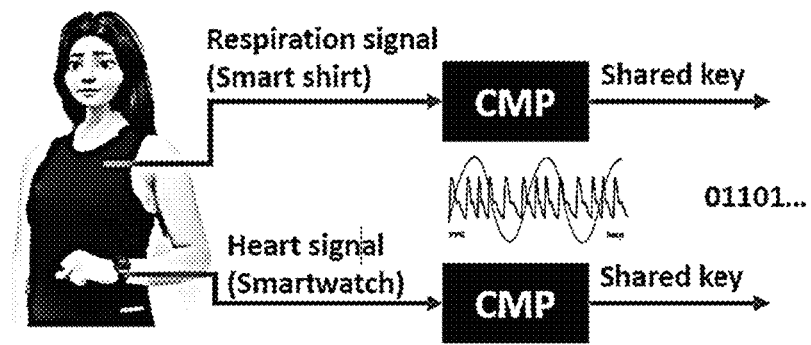
FIG. 5c shows the placement of the smart shirt measuring a respiration signal to generate a shared key, as well as the placement of a smart watch measuring a heart signal to generate a shared key according to methods of the present invention.
Figure 6:
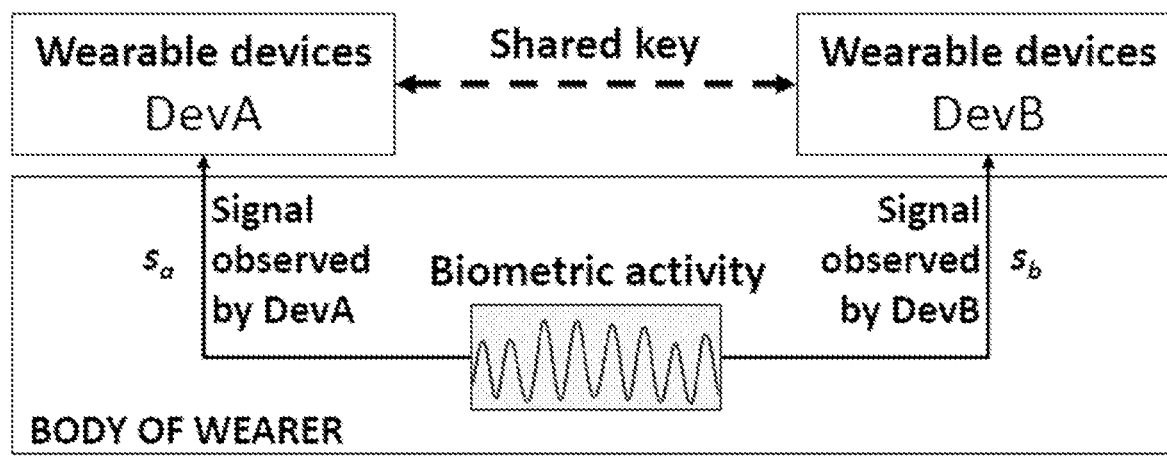
FIG. 6 shows a system model of the biometric-based key generation model according to some embodiments of the present invention.

For example, as shown in FIG. 5c, a user may be wearing a smart shirt capable of measuring respiration activity and a smart watch capable of measuring cardiac activity.

Figure 2A:
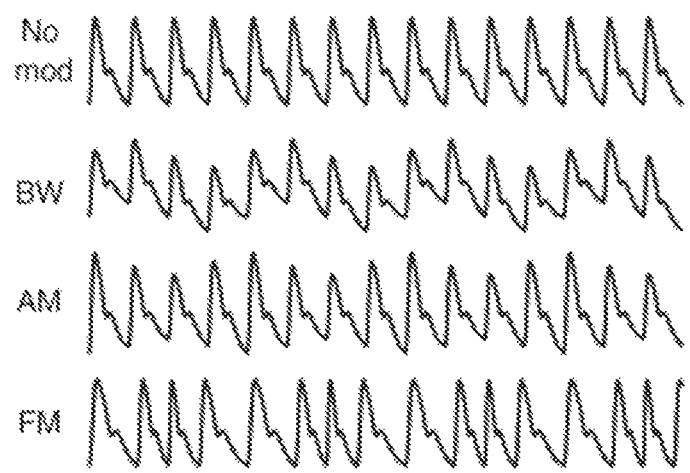
FIG. 2a shows a graph of the idealized respiratory modulations of PPG signals, including no modulation, baseline wander, amplitude modulation, and frequency modulation.
Figure 2B:
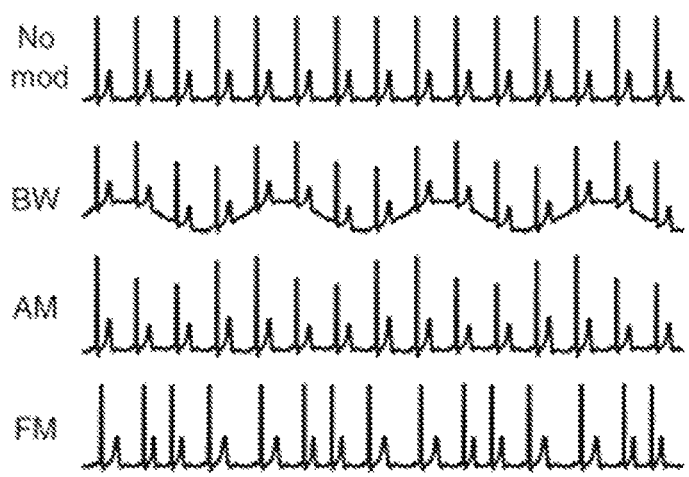
FIG. 2b shows a graph of the idealized respiratory modulations of ECG signals, including no modulation, baseline wander, amplitude modulation, and frequency modulation.

As discussed above, respiratory activity is linked to cardiac activity. Specifically, respiration modulates the PPG and ECG signals through physiological mechanisms. The modulation enables extraction of respiratory signals from the cardiac signals. The PPG data is influenced by changes in venous return and stroke volume caused by changing intra-thoracic pressure during respiration, changes in tissue volume due to varying arterial pressure, and respiratory sinus arrhythmia (RSA), which is variation in heart rate with respiration. The heart rate increases during inspiration and decreases during expiration. As shown in FIG. 2a, the influences result in amplitude modulation (AM) (also referred to as respiratory-induced amplitude variation (RIAV)), baseline wander (BW, also known as respiratory-induced intensity variation (RIIV)), and modulation of beat-to-beat intervals (frequency modulation, FM) (also termed as respiratory-induced frequency variation (RIFV)), respectively. Respiration modulates the ECG data by changing the heart's electrical orientation relative to the electrodes, changing the thoracic impedance, although this is secondary to the changes in orientation, and changing RSA. Amplitude modulation and baseline wander result from the first two mechanisms, while frequency modulation results from the third. FIG. 2b shows the modulations on ECG signals. A number of techniques are known for the extraction of respiratory signals from the ECG and PPG.

Figure 3A:
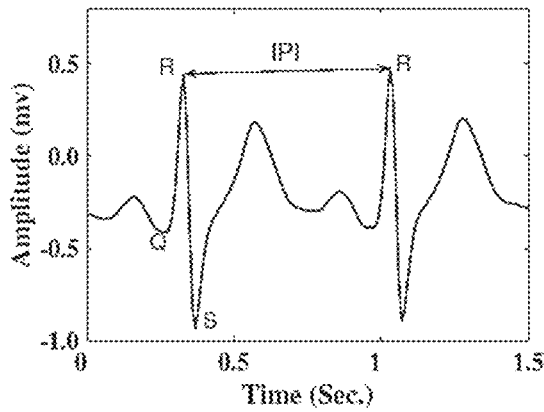
FIG. 3a shows a graph of ECG signals over time with features for determining IPI included.
Figure 3B:
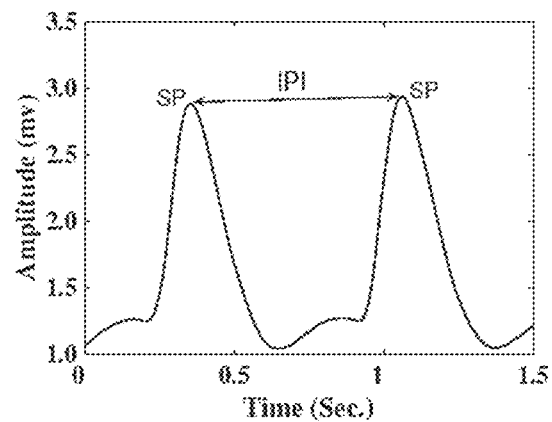
FIG. 3b shows a graph of PPG signals over time with features for determining IPI included.
Figure 3C:
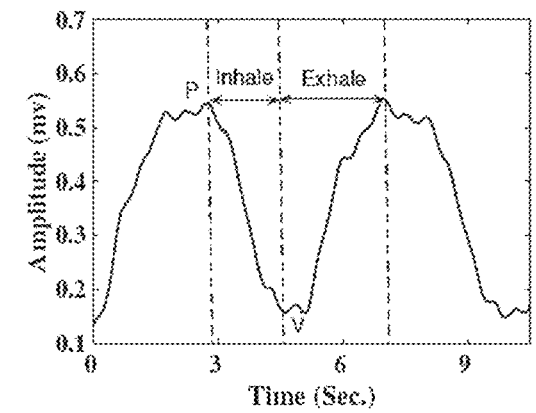
FIG. 3c shows a graph of Respiratory signals over time, noting inhalation and exhalation.

The typical respiratory, ECG, and PPG signals of a healthy individual are shown in FIG. 3a through 3c. Both ECG and PPG signals track the contractions and relaxations of the heart. The typical ECG signal in FIG. 3a shows the major vectors of ventricular activation represented by the three waves, known as QRS complex. The tallest peaks in the ECG signal cycles, which are referred to as R-peaks, represent heart beats. The corresponding peaks in the PPG signals referred to as SP peaks are shown in FIG. 3b. An important feature of cardiac signals is the time interval between two consecutive peaks, which is named inter-pulse interval (IPI). IPI varies from beat to beat. As shown in FIG. 3c, a respiratory signal indicates the amount of air that enters a lung or exits from the lung. The time interval between the respiratory signal's peak P and valley V represents the duration of the user's inspiration, and the difference between P and V is the volume of inhaled air. The volume of air inspired in one minute is referred to as VE.

Figure 4A:
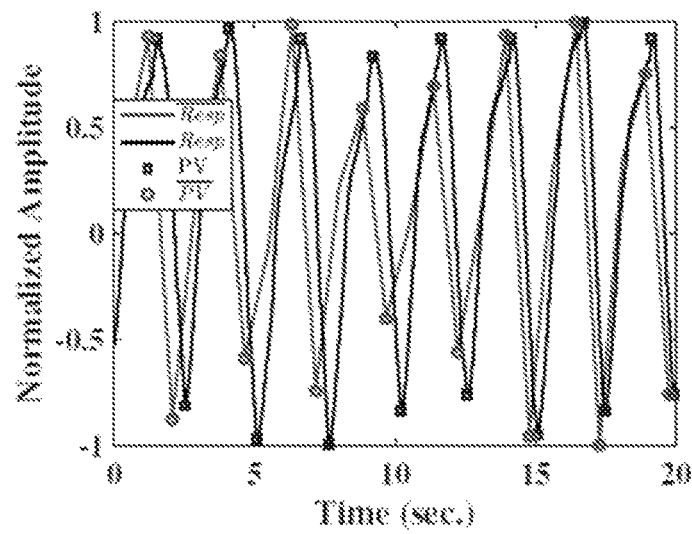
FIG. 4a shows a graph of the actual respiratory signal (Resp) and the respiratory signal extracted from the cardiac signal at rest ($\overline{Resp}$)
Figure 4B:
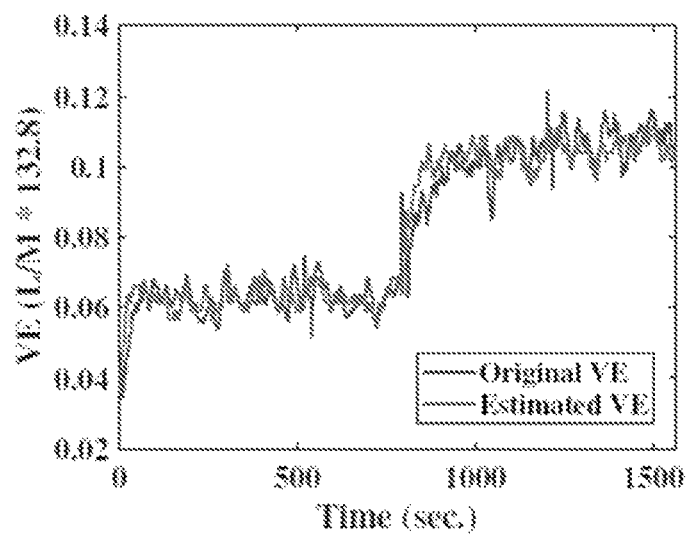
FIG. 4b shows a graph of the actual VE signal and the estimated $\overline{VE}$ signal in moderate and high intensity exercises.

The modulation by respiration on cardiac signals enables the extraction of respiration signals from cardiac signals. Inhalation results in a shorter time interval between consecutive beats, whereas exhalation results in a longer time interval. Therefore, in order to extract the respiratory signal, detection of R-peaks and calculation of IPIs, and plotting their variation over time may be employed. R-peaks can be detected using a standard peak detection algorithm. The peak detection algorithm outputs the timestamps of detected peaks. The timestamp of the ith peak can be denoted as $t_i^P$. Then the IPIs can be calculated as $IPI_i = t_{i+1}^P - t_i^P$. The IPI variation over time indicates the induced respiratory signal. FIG. 4a compares an extracted respiration signal and the corresponding actual respiration signal. Extraction based analysis proved the feasibility of employing this method. Further, the analysis shows that the difference between actual and extracted respiratory signals increases with the exercise intensity level. Without wishing to be bound by theory it is believed this trend is mainly because of the phase lag between the actual signal and the extracted signal.

Models for describing the relationship between the heart and lungs include linear, quadratic, and exponential. In a basic linear model, $VE = a + b_1 HR$, HR is the only independent variable. The constant $\alpha$ represents the intercept (the value of VE when HR=0), and $b_1$ is a constant. In a quadratic model, $VE = a + b_1 HR + b_2 HR^2$, $b_1$ is an additional constant. In an exponential model, $VE = e^{a+b_1 HR}$, HR remains as the only independent variable. Generally, all three models perform better when the user is engaged in moderate or high intensity exercise.

As discussed above, there are a variety of known methods for relating distinct biometric activities. Without wishing to be bound by theory, it is believed that one pairing mode may be better suited for a user performing a high degree of physical activity, and a different pairing mode may be better suited for a user who is at rest. As such, in some embodiments of the present invention the degree of user activity may be determined in order to optimize selection of the pairing mode. In some embodiments, the degree of user activity, or activity level, is determined according to the biometric signals being sensed. In some embodiments, the biometric signal is compared relative to known reference values that associate the type of biometric activity being sensed and the corresponding activity level. In some embodiments, threshold values may be selected according to the processing methods employed, where the processing methods may be optimized according to activity level. Thus, processing methods optimal for high activity levels may be used with a threshold value set at a minimum for high activity level. Likewise, processing methods optimal for low activity levels may be used with a threshold value set at a maximum for low activity level. In some embodiments, activity level may be determined based upon any biometric activity being sensed. The threshold value for determining activity level of a particular sensing modality may be correlated with the threshold value of other sensing modalities, such that shared key generation is optimized.

In embodiments of the present invention sensing respiratory activity and cardiac activity the activity level of a user may be determined using respiratory rate as the activity level value. The normal breathing rate of a human is typically between 12 and 20 breaths per minute and increases up to 40 and 60 breaths per minute during exercise. Since the respiration rate is a proven indicator of the exercise intensity, a switching criterion, also known as threshold value, based on the respiration rate may be used to switch between two pairing approaches for better pairing performance. In these and other embodiments, one pairing approach may be based on the modeling between cardiac and respiratory signals, which may be referred to as model-based processing or model-based pairing. In these and other embodiments, another pairing approach may be based on the extraction of respiratory signals from cardiac signals, which may be referred to as extraction-based processing or extraction-based pairing.

Figure 11A:
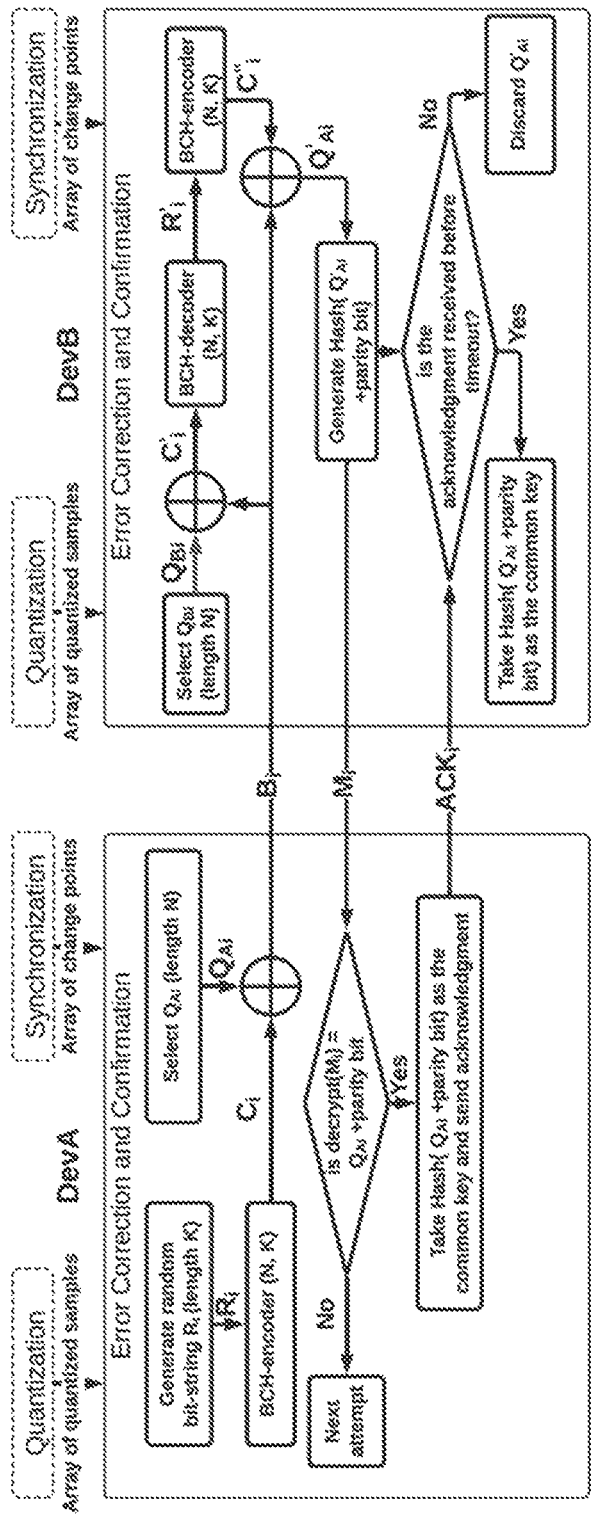
FIG. 11a shows a flow chart for the modified Bose-Chaudhuri-Hocquenghem (BCH) error correction and confirmation of the present invention.

The goal of pairing two wearable devices DevA and DevB is two-fold: ensure that both DevA and DevB are "worn" by the same individual and establish a shared key using information that is shared only by the two devices. An approach that addresses both requirements is to use biometric activity S that can be accessed by the two devices but not by devices that are not connected to the body of the wearer as shown in FIG. 11A. The challenge with using biometric activity is that the sensors of a device do not observe S directly, but rather infer S from physical measurements of features that are accessible to the device (in the example of respiration, these features are ventilation for RIP and chest movement for accelerometer sensors). For a device DevX the observed signal, call it $s_x$, for activity S can be affected in different ways.

The signal $s_x$ can be noisy. Noise can be due to measurement errors, or it can be caused by external disturbances. For example, an accelerometer may capture motions that are not caused by breathing. The signal $s_x$ may also be delayed. This may be due to time discretization or other data collection delays. The signal sx may also have inconsistent specifications, such as different sampling rates or different amplitude ranges. As a result, the two signals $s_a$ and $s_b$, observed by DevA and DevB, are not equal. They may even be difficult to correlate at a granularity fine enough to allow for the reliable and low-latency establishment of shared keys. Since the two devices are collecting respiration signals with different mechanisms, the signals collected by the two devices are not synchronized. Also, different sampling rates are used by the two devices for data collection.

There is also the threat of an outside adversary trying to control the wearable devices. Due to the broadcast nature of wireless communication between wearable devices, an adversary is capable of eavesdropping on the communication between legitimate wearable devices. Through eavesdropping, an adversary can access the content of the exchanged packets between the two devices before their successful pairing, as these packets are not encrypted. Although an adversary cannot attach a wearable device to the body to pair with a legitimate device, an adversary can possibly obtain the average respiration rate and the dynamic respiration rate by remotely observing the victim's breathing activities, typically using a camera, and then process the observed collected data either manually, or using automated tools. An adversary can then generate an approximation of the breathing activity based on the average respiration rate. If the adversary had knowledge of the pairing protocol, the access to the content of packets exchanged between legitimate wearable devices, and access to the biometric activity, an adversary is in a position to launch impersonation attacks, which distinguish themselves primarily by how the biometric activity is observed. With the generated signal, an adversary can attempt to pair with a legitimate device.

For a biomedical-process-based pairing protocol to support a variety of devices, it must address the challenges described above. Those challenges include that the features collected by the different devices give rise to signals with different sample frequencies, amplitudes, and noise characteristics (measurement noise vs. disturbances). Additionally, the signals collected by the different devices are likely not sufficiently synchronized for the devices to use them as shared data needed for the key exchange. In order to minimize its own quantization error, each device optimizes its quantization levels. When devices have different quantization levels, they interpret the signal differently, which leads to mismatches in the pairing process. Finally, even if all challenges above are addressed, errors may remain across the collected signals, which again leads to mismatches in the pairing.

In an example of two signals having different sample frequencies, the signal generated by the higher sampling rate will need to be down-sampled. For example, if the two signals $s_a$ and $s_b$, are collected with sample fates denoted $f_a$ and $f_b$, and if $f_a > f_b$, then the signal $s_a$ will need to be resampled with the sampling rate $f_b$. For down-sampling, skipping can be used (where the sample closest to a sampling point is kept and the rest is skipped) or averaging can be used (where the new sample is interpolated from the closest sample).

If the two signals have different or unequal signal amplitudes, then this can be taken care of through normalization, such that the signal lies in the range of $[-1, 1]$.

If the two signals contain different noise characteristics, a low-pass filter with a cut-off frequency of 0.5 Hz and a band-pass filter with cut-off frequencies of 0.1-0.5 Hz can be used to filter out both measurement noise and disturbances. For example, an accelerometer will pick up motion that is unrelated to breathing and a RIP sensor may get disturbed by the fit of the vest. In order to decrease the difference between two devices, the present invention also utilizes a Savitzky-Golay filter to eliminate the effect of possible noise in the range of the bandpass filter's cut-off frequencies while also smoothing out the respiration signal without changing its features.

Keeping the signals synchronized is important to pairing performance. The synchronization is especially critical for pairing with signals collected with different sensing mechanisms. In such cases, the mode transitions in the biometric activity (inhalation vs. exhalation in the case of breathing) may be detected at different points in time by the different sensing mechanisms. The present invention utilizes a synchronization based on both the obvious features as well as statistical features with a change point detection method described below.

A Change Point (CP) is a point at which some statistical features of a signal, like mean, standard deviation (STD), root mean square (RMS), etc., changes abruptly. The three main statistical features, i.e., mean, STD, and RMS are compared, in terms of the pairing performance. Due to the motion artifacts, accelerometer data is noisier than RIP data. Hence, some sudden change may happen in the noisy parts of the accelerometer signal, which is not a CP in the RIP signal. To address this problem and find the common CPs precisely, the respiration cycles are found based on signal peaks and valleys, and then the biggest CPs within each peak-valley need to be identified.

There is also the issue of a lack of uniform quantization levels between various wearable devices. Quantization converts continuous infinite values to a smaller set of discrete finite values that can be represented by a fixed number of bits. On the one hand, quantization can possibly remove differences in the biomedical signals that are caused by differences in sensing mechanisms and sensing noise by converting close values of two signals into the same discrete value that can be represented by the same set of bits. On the other hand, quantization can also cause a loss of information. For example, a small fluctuation in a respiration signal caused by a small change in breathing may be detected by one device but not by another because they do not use the same quantization levels. The number of quantization levels largely determines the number of differences that the quantizer will remove by quantizing the different values into the same quantization level. A smaller number of quantization levels leads to larger intervals between two successive quantization levels and then possibly removal of more differences. On the other hand, the number of quantization levels determines the number of bits needed to represent each quantization level. Therefore, a larger number of quantization levels means more bits can be generated from each sample. In other words, more information about the respiration dynamics can be captured. Meaning that the parameter can affect the pairing performance greatly.

Figure 8A:
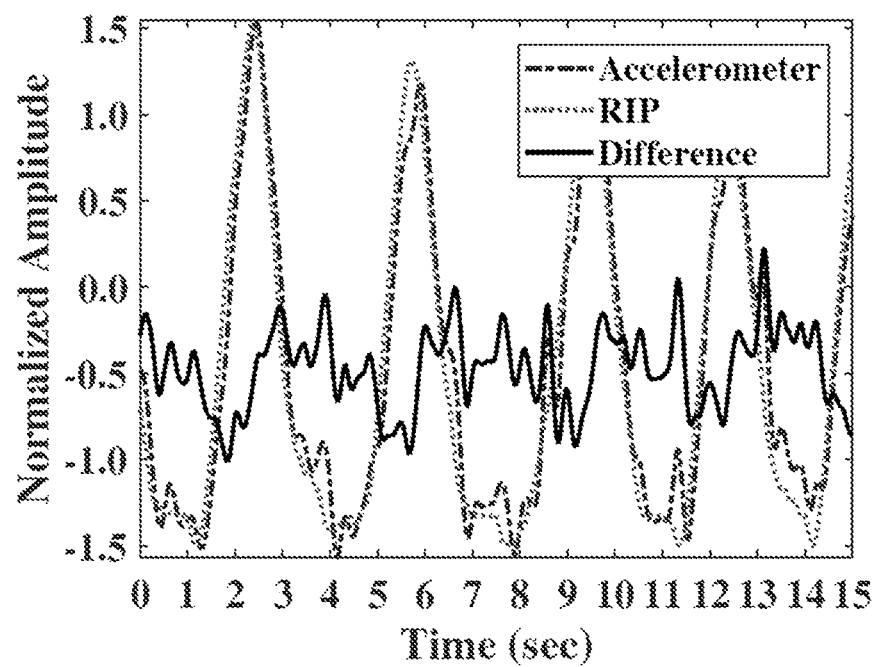
FIG. 8a shows a graph of respiration signals as measured by respiratory inductance plethysmography bands and an accelerometer sensor.
Figure 8B:
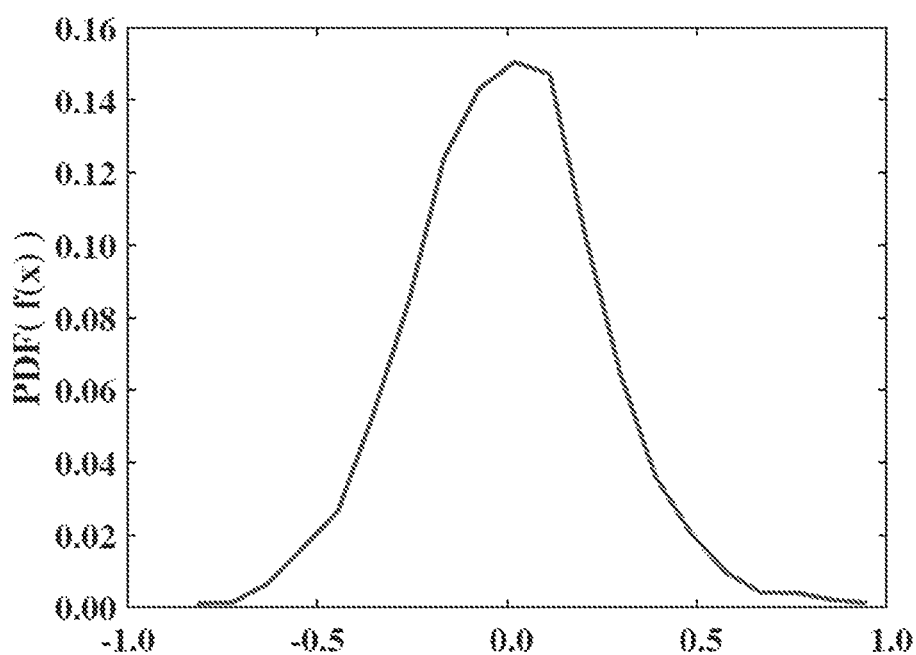
Figure 9A:
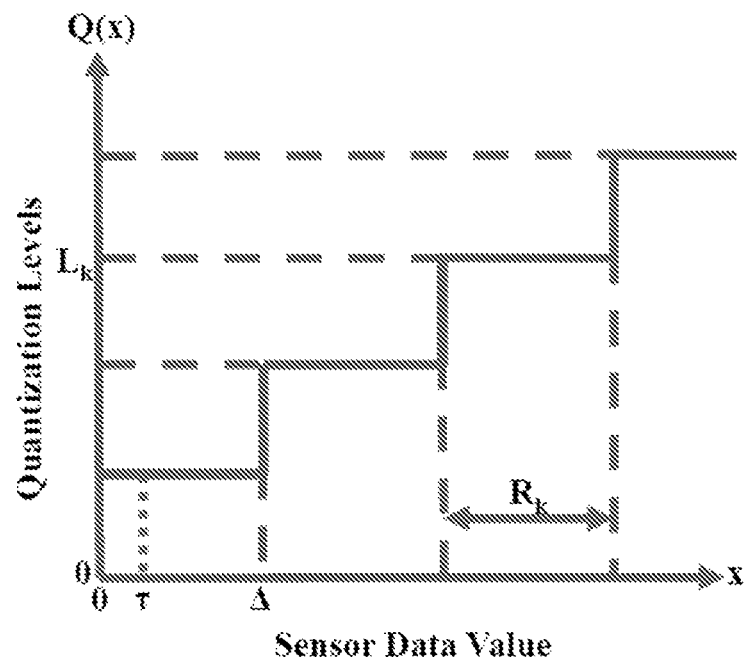
FIG. 9a shows a graph comparing quantization levels versus sensor data values.
Figure 9B:
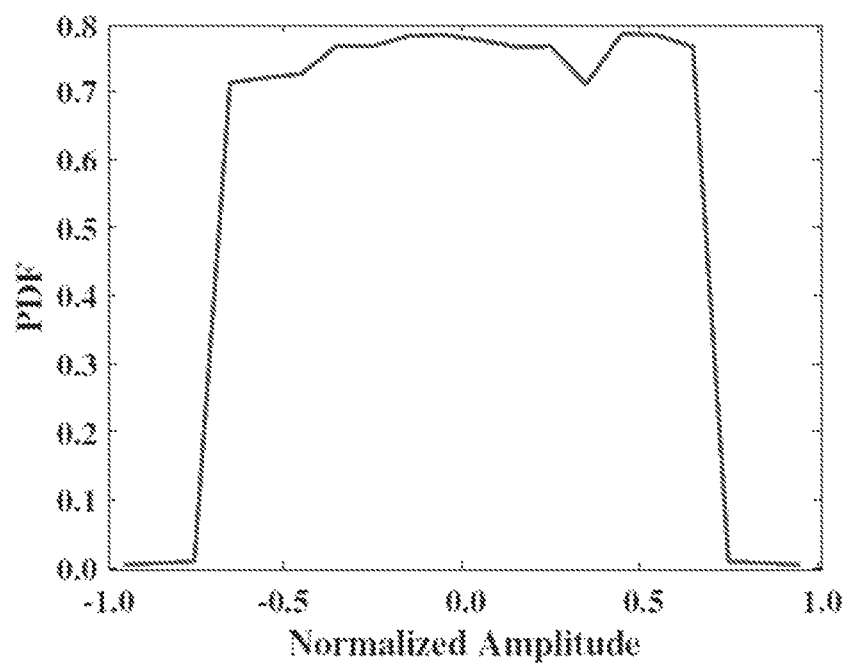
FIG. 9b shows a graph of breathing signal distribution.

Traditional quantizers are optimized to minimize the quantization error, defined as the difference between actual values in the x-axis and the corresponding quantization levels as shown in FIG. 9a. For pairing with different types of sensors, the number of bits that can be agreed upon by two sensors of different types on each sample needs to be maximized, which is also the ultimate goal for pairing. A typical example of respiration signals collected by a RIP sensor and an accelerometer is shown in FIG. 8a. The difference between the two respiration signals is also shown in FIG. 8a. FIG. 8b shows that the difference can be modeled as a Gaussian distribution. The data collected from 30 participants also shows that the normalized signal values collected from the sensors can be approximated as a uniform distribution as shown in FIG. 9b. This data helped determine that the optimal number of quantization levels is four, and correspondingly, the number of bits per sample is two.

In some embodiments, Lloyd-Max quantization may be used in place of uniform quantization to convert sample values into bits. A scalar quantizer partitions signal amplitude into M regions $R_1, \ldots, R_M$, and represents each region $R_k$ by a quantization level $L_k$. Hence, it can be displayed as a function that maps real values x into discrete values Q(x) where $Q(x)=L_k$, $x \in R_k$, $k=1, \ldots, M$. The best values for quantization regions and their corresponding quantization levels is found by considering the boundaries of the quantization regions as the midpoints of the corresponding quantized values, $$a_i = \frac{1}{2}(L_i + L_{i+1}), i = 1, \ldots, M-1$$

and the quantized values as the centroid of the quantization regions, $$L_i = \frac{\int_{a_{i-1}}^{a_i} x f_x(x) dx}{\int_{a_{i-1}}^{a_i} f_x(x) dx}, i = 1, \ldots, M-1$$

where $f_x(x)$ is the probability density function (PDF) of the signal X. Using Lloyd-Max quantizer over a sliding window of size w can balance the entropy and mismatch rate on all quantized bits.

The Lloyd-max quantizer is known for minimizing the quantization error, in other words, the difference between a sample value and the corresponding quantization level, by optimizing the quantization intervals. Embodiments of the present invention using cross-modal pairing may use Lloyd-max quantizer to maximize the number of bits that can be agreed on by the two devices. Lloyd-max quantizer essentially allocates more quantization levels to more frequent ranges of sample values. Since more quantization levels need more bits to represent, the quantizer enables the two devices to agree on more bits for key generation.

Both down-sampling and normalization, as well as quantization, can remove differences in biometric signals collected with different sensing mechanisms. But there can still remain some differences not removed by these techniques. These remaining differences can cause mismatches between bits generated by the quantizers of both devices. So, it is necessary that the present invention use some form of mismatch correction to remove bit mismatches. Mismatches in this invention are like errors in a communication channel. Hence, it is possible to use an error correction code (ECC) to fix the mismatches However, using a plain error correction code (ECC) not only is vulnerable to data leakage but also adds overhead to the protocol and can decrease entropy. Therefore, the present invention utilizes a modified Bose-Chaudhuri-Hocquenghem (BCH) error correction code to address these issues and correct the mismatches. The BCH method can be used both as an encryptor and as an ECC without leakage vulnerability in the mismatch correction stage.

Figure 11B:
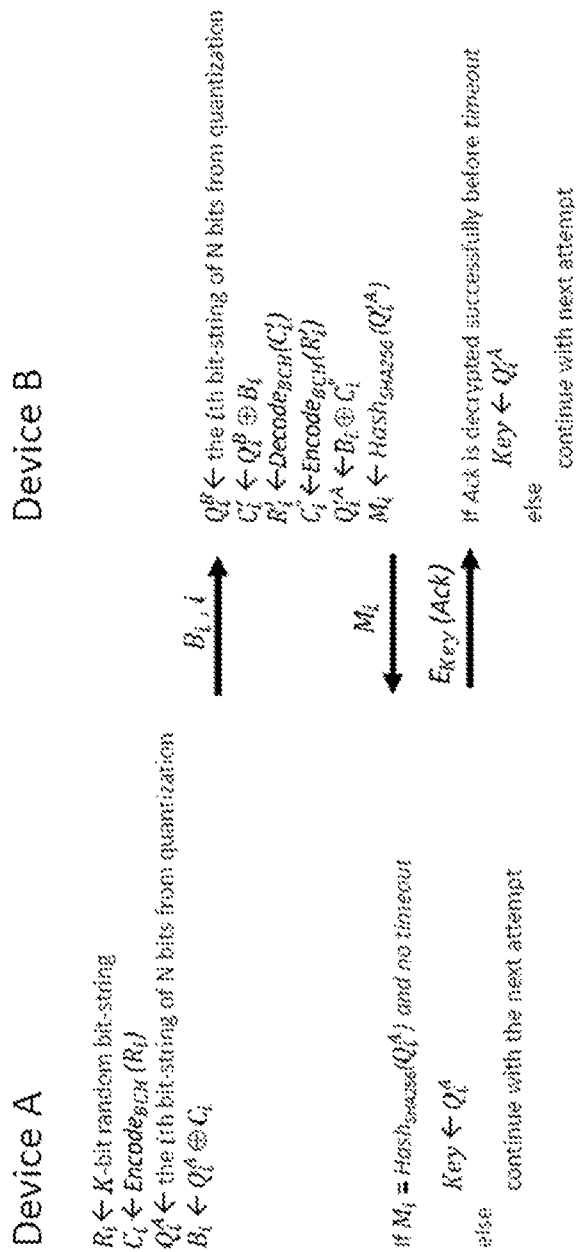
FIG. 11b shows

The drawback of using plain BCH code is that the overhead of check bits is too high for resource-constraint devices like wearables. To eliminate the overhead, the modified BCH of the present invention utilizes a code of length N that can carry a message of length N. This method is shown in FIGS. 11a and 11b. For the pairing based on the ith CP, DevA generates a random bit-string $R_i$, of length K, and uses a BCH-encoder to encode it into codeword $C_i$, of length N. Then DevA selects $Q_{Ai}$ which is N bits of quantized bits around the ith CP and generates block $B_i$ by performing an exclusive or (XOR) operation on $C_i$ and $Q_{Ai}$. It then sends $B_i$ to DevB over an unencrypted channel. When DevB receives it selects its $Q_{Bi}$ and performs XOR on $B_i$ and $Q_{Bi}$ to extract $C'_i$. Then it uses the BCH-decoder to extract $R'_i$. As long as the number of mismatch bits between $Q_{Ai}$ and $Q_{Bi}$ is less than t, we have $R'_i=R_i$. Afterward, DevB uses the BCH-encoder to encode $R'_i$ to $C''_i$ and does XOR on $C''_i$ and $B_i$ to derive $Q'_{Ai}$. Finally, DevB uses the derived key $Q'_{Ai}$ to encrypt a confirmation message $M_i$ and sends it to DevA. Upon receiving $M_i$, if DevA was successful in decrypting $M_i$, it means $Q'_{Ai}=Q_{Ai}$, therefore, DevA uses $Q_{Ai}$ as the common secure key and sends an acknowledgment message to DevB. If DevA fails to decrypt $M_i$, it will continue with the next pairing attempt. This procedure will be continued until a common key is found or a timeout occurs. The agreed bit string $Q_{Ai}$ is of N bits, and $N=2^m-1$. If N is larger than l, the length of a desired key, the first l bits of $Q_{Ai}$ can be selected to form a key. If N=l, a parity bit of $Q_{Ai}$ can be appended to $Q_{Ai}$ to form a key. The wearable devices can run this protocol regularly to generate a new secure key.

Figure 10:
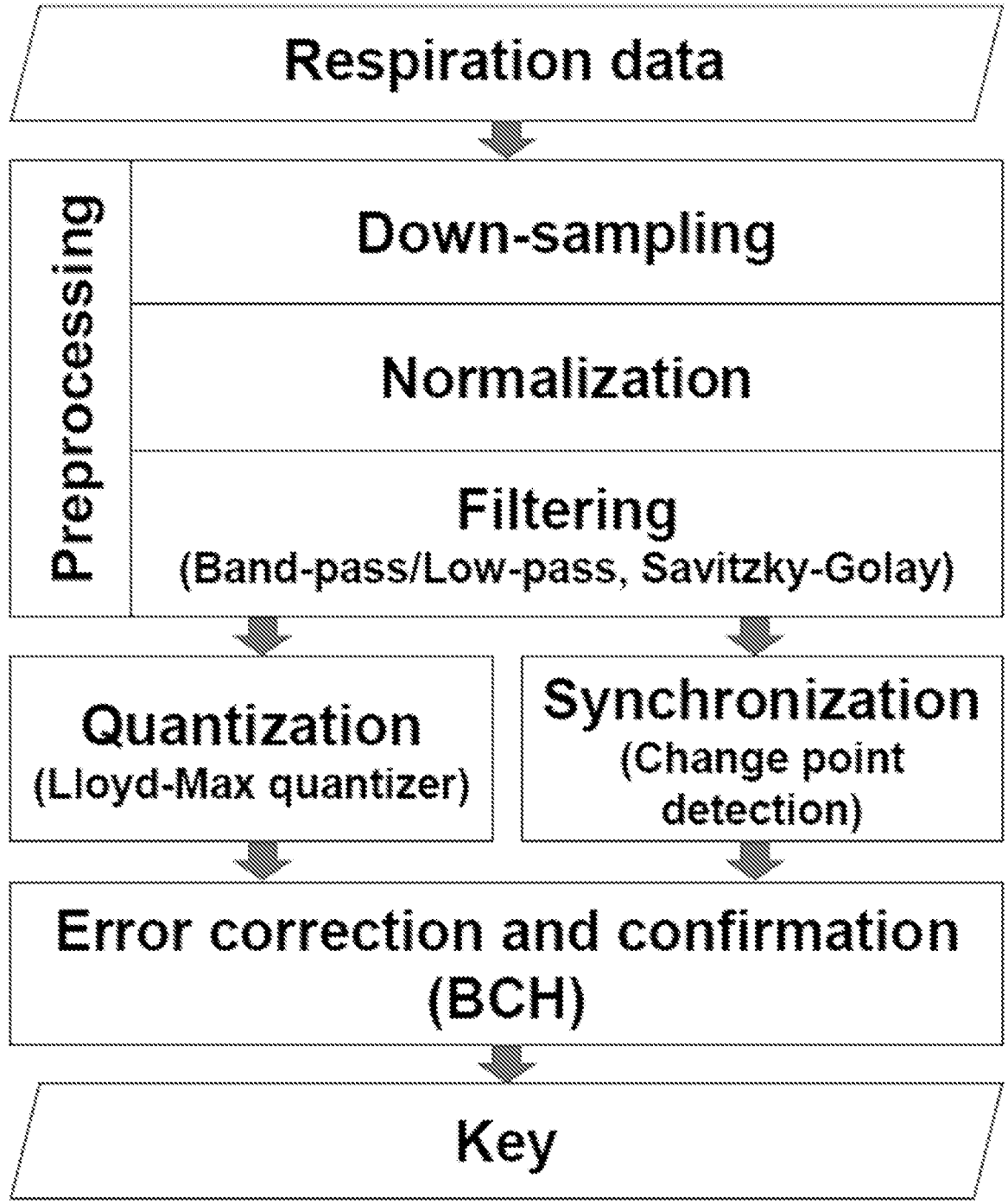
FIG. 10 shows a flow chart of the breathing protocol of the present invention.

A protocol of the present invention, as shown in FIG. 10, consists of four main modules. The first module, called Signal Preprocessing, is designed to handle the differences in the data collected by different sensing mechanisms and the filtering of the noise outside the respiration frequency range. It implements the necessary down-sampling of the data, the normalization of the amplitudes and the filtering. The next module, called the Quantization module, is designed to tolerate the differences (primarily different quantization levels) caused or applied by the differences in sensing mechanisms. The third module, called the Synchronization module, uses change point detection (CPD) methods to detect changes that can be used to synchronize signals collected by the different sensing mechanisms. The final module, called the Mismatch Correction and Confirmation module, is designed to correct bit mismatches caused by differences that cannot be removed by the Quantization module. It uses a variation of the BCH code to do that. This module also contains the mechanics of the shared-key generation, described in detail below. The output of the protocol implementation is the shared key.

Figure 7:
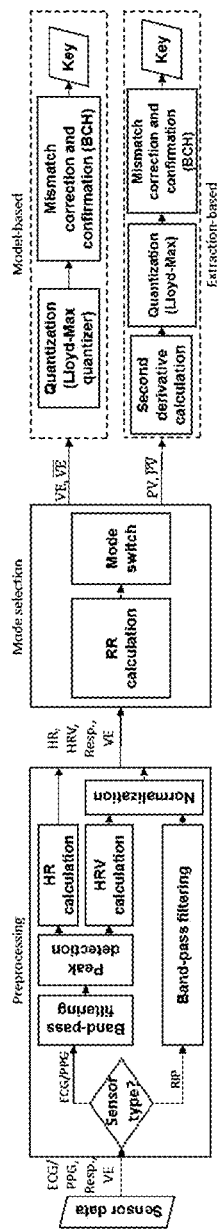
FIG. 7 shows a system model of the biometric-based key generation model according to some embodiments of the present invention.

A protocol of the present invention, as shown in FIG. 7, consists of four main modules for model-based pairing and five main modules for extraction-based pairing. The preprocessing module is designed to filter noise outside the respiratory or cardiac frequency range and normalize signal amplitude. The mode switch module switches the pairing modes based on the respiration rate for better paring performance. Both pairing modes contain the quantization module as well as the mismatch correction and confirmation module. The quantization model is designed to tolerate difference caused different sensing modalities and sensing noise. The error correction and confirmation module corrects bit mismatches caused by differences that cannot be removed by the quantization module with Bose Chaudhuri Hocquenghem (BCH) code. Both devices confirm agreement on a key through the confirmation module. The extraction-based pairing includes an extra module for computing the second derivative of respirations' peak-valleys. This module addresses the difference between the peak-valley amplitudes of the two devices.

The purpose of the preprocessing step is to extract data for pairing from raw signals collected by sensors. The extraction starts with filtering raw signals to remove noise outside the frequency ranges of respiratory or cardiac dynamics. Then the filtered raw signals will be processed to generate time series data to be used for pairing. To remove differences on the ranges of time series data collected by the two different sensors, the time series data are normalized.

For cardiac sensors, raw signals collected by an ECG/PPG sensor contain noise due to external disturbances and measurement errors. A bandpass filter with cutoff frequencies of 0.5 Hz and 3 Hz can be used to filter out both measurement noise and disturbances. The two cutoff frequencies correspond to the minimum and maximum heart rate in the resting and vigorous activities, respectively. The filtered ECG/PPG signals are normalized within the range of [−1, 1]. The normalization will also remove the DC component so that the signal average is zero. A standard peak detection algorithm can be used to extract IPIs. Time series data of heart rate, denoted as H, can be generated by sampling the timestamps as follows:

$$h_i = \frac{n^p}{t_j^p - t_{j-n^p}^p}$$

where $h_i$ denotes the heart rate obtained from the ith sample interval, $n^p$ is the number of previous peaks included in the heart rate calculation, and the jth peak is assumed to be the last peak in the ith sample interval. The time series data H will be used for model-based pairing and the time series data IPI will be further processed for extraction-based pairing in the following modules.

For a RIP sensor, in order to respiratory signal, a bandpass filter with cutoff frequencies of 0.1 Hz and 1 Hz is used to filter the raw RIP signals. The cutoff frequencies are selected because human respiration rate ranges from 6 BPM to 60 BPM [27]. The filtered respiratory signal is normalized to the range of [−1, 1]. The filtered and normalized respiratory signal will be processed further for extraction-based pairing.

As discussed above, switching based upon respiration rate may be used for some embodiments of the present invention. The calculation for a RIP sensor is based on the respiratory signal, one of the signals output by the preprocessing module. For a cardiac sensor, the calculation is based on time series data IPI extracted from raw cardiac signals. The calculation begins with the peak and valley detection in the signals. A standard peak detection algorithm can be used to detect peaks. Valleys can be detected by running the standard peak detection on the flipped version of the same signal. The timestamp of the jth detected peak or valley can be denoted as $t_j^{pv}$. Suppose the jth peak or valley is the last peak or valley in the ith sample interval, We can calculate the respiration rate of the ith sample interval, denoted as $r^i$, as follows:

$$r^i = \frac{n^r/2}{t_j^{pv} - t_{j-n^r}^{pv}}$$

where $n^r$ is the number of peaks and valleys included in the respiration rate calculation. Since each breathing cycle contains one peak and one valley, $n^r/2$ is the number of breathing cycles included in the respiration rate calculation. The length of a sample interval is set to be two seconds because the respiration rate of a healthy person is typically between 12 and 20 breaths per minute. The two-second long sample interval can ensure that at least one new peak or valley is included in the calculation for each sample interval. Having a new peak or valley in the calculation can bring new information into each sample and lead to improvement on entropy of key bits.

Since breathing activities can be easily observed by an adversary as discussed above, impersonation attacks can be launched with the information obtained from the observations to pair with legitimate devices. The impersonation attacks can be especially effective in compromising the pairing between devices with different sensing mechanisms. For example, as described above, filtering techniques are used to remove differences caused by different sensing mechanisms for better agreement on key bits. But the filtering can also smoothen out sudden changes that can be captured by the respiration sensors but may not be observable by the adversary. So instead of relying on the sudden changes that cannot be observed by the adversary to mitigate impersonation attacks, the present invention mitigates the attacks by segmenting the signals.

The segmenting method divides an output bit string from the quantizer, with respect to a change point, into $n_{seg}$ segments. Instead of using bits from successive segments for pairing, the method may skip neighboring segments and use only bits from selected segments for pairing. The smoothing effect brought by the filtering can make the next few samples of a sensor signal predictable if the adversary can estimate the value of one sample with reasonable accuracy. But the predictability can reduce greatly if the samples are relatively distant from the sample that the adversary may estimate accurately. Therefore, the best segment choice should contain segments that are distant from each other.

Figure 13:
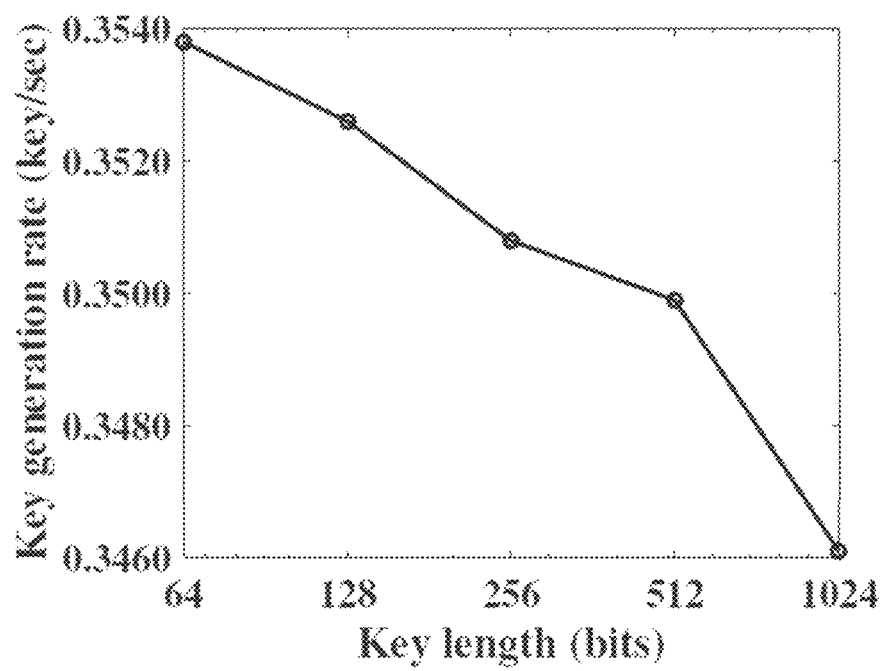
FIG. 13 shows a graph of the effect of different key lengths on KGR.

The method of the present invention can generate about 0.35 keys per second across a variety of key lengths, as shown in FIG. 13. The key generation rate decreases slightly when the key length increases, as pairing attempts for longer keys are more likely to fail because of the sensing noise and the difference in sensing mechanisms. The method of the present invention makes pairing attempts at detected change points. Therefore, the number of pairing attempts does not change with the key length. For instance, a 1024-bit key can be based on a signal fragment with three respiration cycles, and there can be five change points in the signal fragment. As a result, the 1024-bit keys generated at these 5 change points will have some overlap. Table I shows the parameters and methods used to generate the results described above.

TABLE 1

Typical Parameters

| Parameter | Value |
| --- | --- |
| Key Length (Bits) | 256 |
| BCH Parameters (N, K) | (255, 115) |
| Number of Bits per sample | 2 |
| Sync Offset (ms) | 250 |
| Number of Change Point Offsets | 2 |
| Change Point numbers per peak-valley | 1 |
| Code type | Gray |
| CPD method | STD |
| Down-sampling | Skip |

As Table II shows, the method of the present invention can generate a 128-bit key every 3.43 seconds and a 256-bit key every 4.39 seconds while the bit agreement for the attacker tops out at 64% and 62%, respectively. In comparison, a heartbeat based pairing protocol based on the interval between two peaks in a heart-beat signal (inter-pulse interval (IPI)) needs more than 40 seconds to generate a 128-bit key, and its bit-agreement rate is 75%. A shaking-based pairing approach generates a shared key every 6.58 seconds. Another context-based approach introduced a gait-based pairing method that takes 5 seconds to generate a shared key. The bit-agreement rate for this attack is 60%. Although the aforementioned studies used signals that have higher frequencies than the respiration signal, their key generation rates are less than that of the present invention.

TABLE II

Comparison with other Pairing Methods

| Scheme | Key Length (bit) | User KGR (key/sec) | Attacker bit agreement |
| --- | --- | --- | --- |
| Heart-Beat Based | 128 | 0.0239 | 75 |
| Shaking Based | 128 | 0.1520 | N/A |
| Gait Based | 128 | 0.2000 | 60 |
| Breathing Based (Present Invention) | 128 | 0.2913 | 64 |
| Breathing Based (Present Invention | 256 | 0.2278 | 62 |

Dealing with different types of sensors to generate a shared key is a main contribution of the present invention. The present invention shows how it is possible to use RIP and accelerometer sensors to generate a shared secure key in only one breathing cycle. Although RIP sensors are not widely used in common wearable devices at this time, smart shirts such as Hexoskin® are already available, and they are increasingly being used by professional or amateur sportsmen and women, astronauts, and researchers. With the advancement of healthcare IoT devices, RIP sensors will be embedded in more future wearable devices. Therefore, the method of the present invention can be utilized in these devices to facilitate their secure communication with other IoT devices.

According to some embodiments, a cross-modality pairing (CMP) protocol to enable key generation between wearable devices with different sensing modalities is disclosed. Two or more pairing modes may be utilized to optimize pairing. Examples of pairing modes include model-based pairing, based on mathematical models between respiratory and cardiac signals, and extraction-based pairing, based on the extraction of respiratory signals from cardiac signals. The pairing performance of these two modes varies with exercise intensity level. To take full advantage of both pairing modes, a switching mode based on the respiration rate, a reliable indicator of exercise intensity level, may be used. In some embodiments, a Lloyd-Max quantization and a BCH-based mismatch correction method are employed to digitize the signals and correct mismatches between bit-strings. In these and other embodiments, cross-modality pairing is able to generate about 0.0125 keys per second with high resistance to impersonation attacks and negligible battery consumption.

In light of the foregoing, it should be appreciated that the present invention significantly advances the art by providing a respiration-based pairing protocol for wearable devices that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

EXAMPLES

The following examples are offered to more fully illustrate the invention, but are not to be construed as limiting the scope thereof. Further, while some of examples may include conclusions about the way the invention may function, the inventors do not intend to be bound by those conclusions, but put them forth only as possible explanations. Moreover, unless noted by use of past tense, presentation of an example does not imply that an experiment or procedure was, or was not, conducted, or that results were, or were not actually obtained. Efforts have been made to ensure accuracy with respect to numbers used (e.g., amounts, temperature), but some experimental errors and deviations may be present.

The foregoing experimental parameters and set-ups were used to generate the data and information provided herein in support of the claimed invention. Although the invention has been described in detail with particular reference to certain embodiments detailed herein, other embodiments can achieve the same results. Variations and modifications of the present invention will be obvious to those skilled in the art and the present invention is intended to cover in the appended claims all such modifications and equivalents.

Example 1. Breathe-to-Pair

Figure 12:
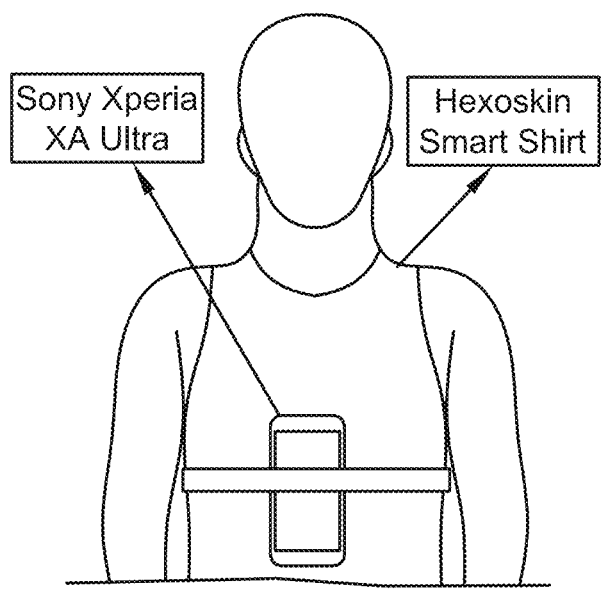
FIG. 12 shows an experimental mock-up of a human user wearing two different wearable devices.

The devices used for the performance evaluation were a Hexoskin®smart shirt and two smartphones. More specifically, the RIP sensor on the Hexoskin®smart shirt and the accelerometers on the smartphones were used to collect respiration signals for pairing. The specifications of the sensors used in pairing are presented in Table III below. As shown in Table III, the RIP sensor and the accelerometers sense the respiration activities in separate ways. Data was collected from 30 participants, including 19 males and 11 females, with a mean age of 30.14 years (between 20 and 43). The experimental setup is shown in FIG. 12. The participants were asked to wear the smart shirt, attach the smartphone to their chest, and sit on a chair. The experiment duration was about 5 minutes per participant.

TABLE III

Sensor Specifications

| Sensor | Device | Sensing Mechanism | Sampling Rate (Hz) | Resolution (bit) | Unit |
|---|---|---|---|---|---|
| RIP | Hexoskin ® Smart Kit | Measuring pulmonary ventilation | 128 | 16 | mL |
| 3-axis accelerometer | Sony Xperia XA Ultra and an HTC One E9 Plus | Measuring acceleration forces | 100 | 13 | G |

The pairing performance was evaluated based on a key generation rate and the entropy of the generated key. The key generation rate is defined as the number of keys generated per second. Practical systems often use keys with a length of 128 or 256 bits. Therefore, these two key lengths were focused on in the evaluations. In general, a higher key generation rate is desired. The entropy of the generated key is defined as a measurement of "surprise" contained in the generated keys by measuring the entropy.

The false positive ratio, the false negative ratio, and the bit agreement ratio were also determined. The false-positive ratio (FPR) is defined as the percentage of pairing attempts that incorrectly generate common keys among all the expected unsuccessful attempts. This metric indicates the likelihood of an adversary successfully pairing with a legitimate device The FPR can be computed as FPR=FP/EN, where FP is the number of incorrectly generated keys, and EN is the number of expected unsuccessful attempts. The false negative ratio (FNR) is defined as the percentage of incorrectly unsuccessful pairing attempts among all the expected successful pairing attempts. It indicates the probability that two legitimate devices attached to the same body cannot pair successfully. FNR is computed as FNR=FN/EP, where FN is the number of incorrectly missed keys, and EP is the number of expected successful attempts. The bit agreement ratio (BAR) is defined as the percentage of matched bits in bit strings generated by two devices. BAR is used to evaluate the protocols resistance to impersonation attacks. Since a successful pairing attempt needs a 100%-bit agreement ratio on key bits, the BAR indicates how close an adversary comes to pair with a legitimate device. Table IV shows all the performance metrics used in the experimental study.

TABLE IV

Achievable Key Generation Rates

| Performance Metric | 128-bit Key | 256-bit Key |
|---|---|---|
| Key Generation Rate (key/sec) | 0.3526 | 0.3508 |
| Entropy | 0.99 | 0.97 |
| False Positive Ratio (%) | 0.064 | 0.028 |
| False Negative Ratio (%) | 0.0003 | 0.0007 |
| Bit Agreement Ratio (%) | 64 | 62 |

In the following experiments, the parameters were varied in each experiment and the rest of the parameters were kept constant.

Impact of Down-Sampling

In this experiment, two down-sampling methods were compared: skip and average. The RIP sensor has a much higher sampling rate than the accelerometers. So down-sampling is applied to respiration signals collected with the RIP sensor. Table V below shows the pairing performance of the two methods. The key generation rates for both methods are very close. The low-pass and band-pass filters used in the filtering both have a cut-off frequency much lower than the sampling rates. Therefore, the differences between the two methods occurring at the sampling rates, much higher than the cut-off frequency, are largely filtered out.

TABLE V

Impact of Down-Sampling on Performance Metrics

| Down-Sampling | Average | Skip |
|---|---|---|
| Key generation rate (key/sec) | 0.2385 | 0.2382 |
| Entropy | 0.94 | 0.96 |
| False Positive (%) | 0.027 | 0.0281 |
| False Negative (%) | 0.0008 | 0.0007 |

Impact of Filtering

Figure 14A:
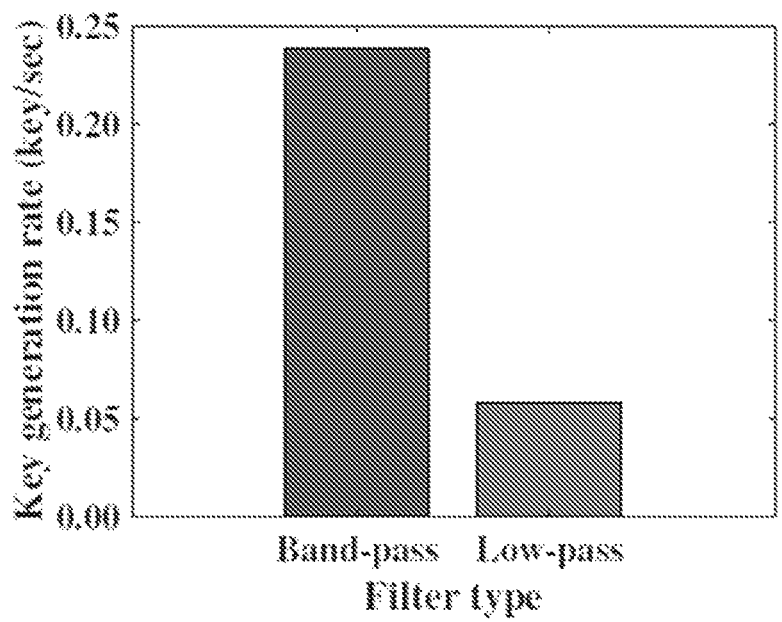
FIG. 14a shows a bar chart of the impact of filtering on the key generation rate.
Figure 14B:
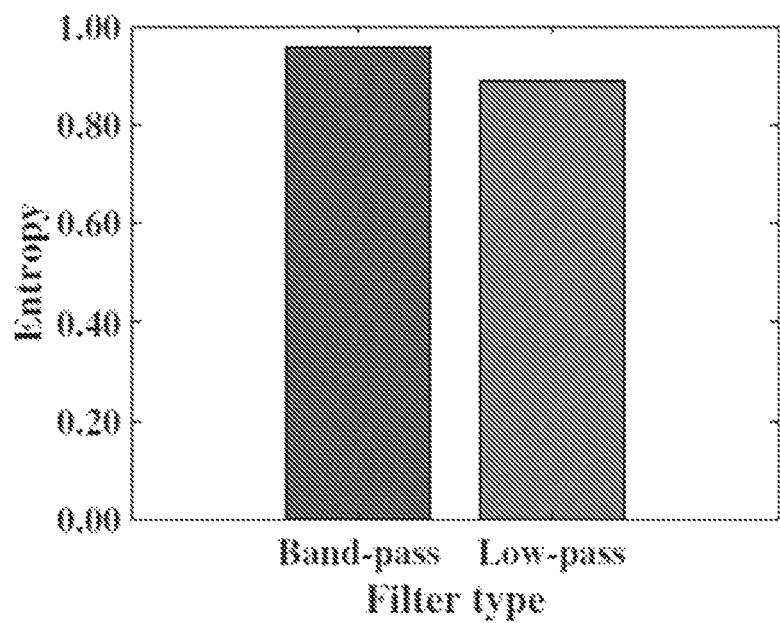
FIG. 14b shows a bar chart of the impact of filtering on entropy.
Figure 14C:
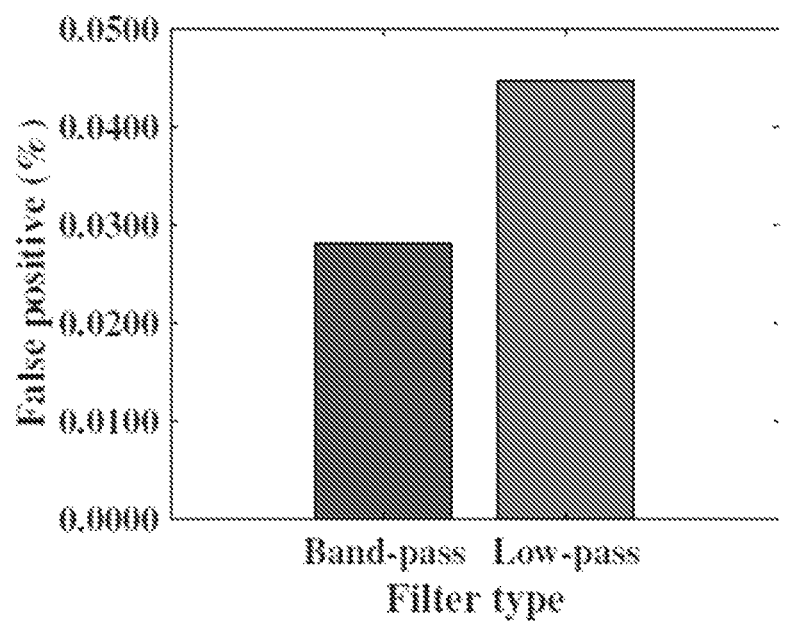
FIG. 14c shows a bar chart of the impact of filtering on the false positive ratio.

Choosing an effective filter can significantly affect the system's performance, as it removes undesired frequencies and noises. FIG. 14a shows how, in comparison with a low-pass filter, a band-pass filter with cutoff frequency in the range of (0.1, 0.5) causes a significant improvement of the key generation rate (KGR). The rationale behind this outcome is that the accelerometer signal contains a lot of external disturbances due to the user's motion. Since most of the user motion happens at low frequency, the band-pass filter removes most of them while the low-pass filter does not affect the user's low-frequency motions. The most considerable motion noise occurs at the end of the exhalation phase (the valleys in FIG. 8a) because the diaphragm usually has a short stop there. This stop point affects the detected signal of both devices. The band-pass filter also smooths these points and leads to an increase in entropy, as shown in FIG. 14b. FIG. 14c shows an improvement in FPR that is due to having a smoother signal. However, the FNR does not change by changing the filtering method. As Table VI shows, applying the Savitzky-Golay filter generally improves all the performance metrics because it removes undesired dynamics that the band-pass filter cannot.

TABLE VI

Impact of Applying the Savitzky-Golay Filter on Performance Metrics

| | Without Savitzky-Golay Filter | With Savitzky-Golay Filter |
|---|---|---|
| Key generation (key/sec) | 0.2382 | 0.2532 |
| Entropy | 0.88 | 0.96 |
| False Positive (%) | 0.0285 | 0.0281 |
| False Negative (%) | 0.0008 | 0.0007 |
| Bit Agreement (%) | 59.1 | 58.66 |

Impact of Synchronization

Synchronizing the signals collected from independent devices is always challenging for pairing. The task is even more challenging for pairing with sensors with different sensing mechanisms. As described above, a change point detection (CPD) method was utilized to detect the significant changes in the signal observed by both devices and change points were used to synchronize the two signals. The five parameters that affect the detected change points and pairing performances were studied: CPD method, number of change points per peak-valley, CPD threshold, CP offset, and synchronization offset.

CPD Method

Since the respiration signal is a low frequency signal, even small changes in its frequency can be detected using the STD-based CPD. Its advantages over other statistical metrics are shown in the FIGS. 10a and 10b. In the rest of the experiments on CPD parameters, only STD-based CPD was studied.

Number of Change Points per Peak-Valley

To select a change point in a peak-valley duration, the method of the present invention first detects all the change points in that duration, then sorts them and selects the most significant CPs. FIGS. 10c and 10d show that although increasing the number of change points (nCP) can increase the KGR significantly, it biases the final key and decreases its entropy in a way that is not reliable as a secure key.

CPD Threshold Level

Figure 15A:
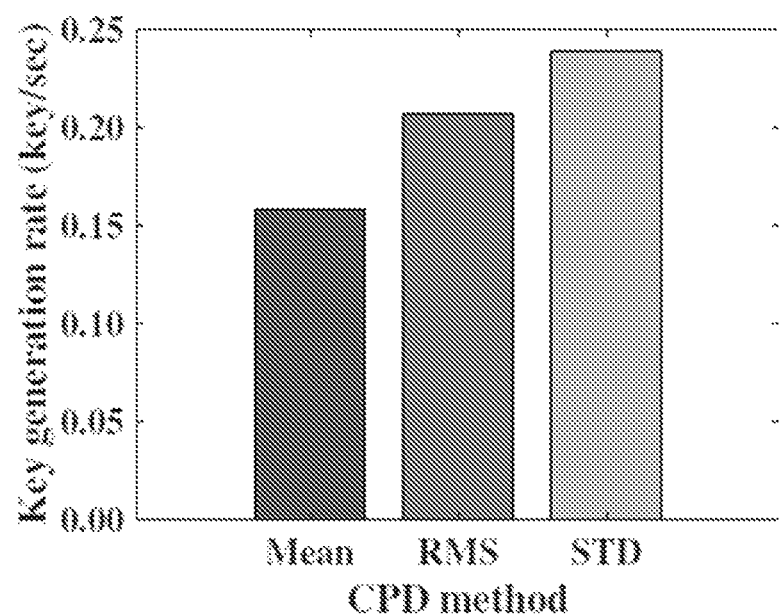
FIG. 15a shows a bar chart of the impact of synchronization on the CPD method versus the key generation rate.
Figure 15B:
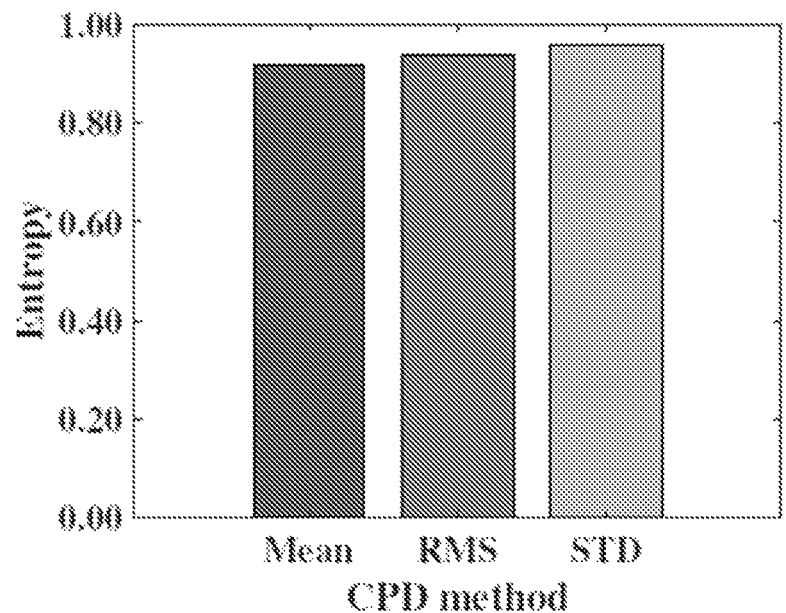
FIG. 15b shows a bar chart of the impact of synchronization on the CPD method versus entropy.
Figure 15C:
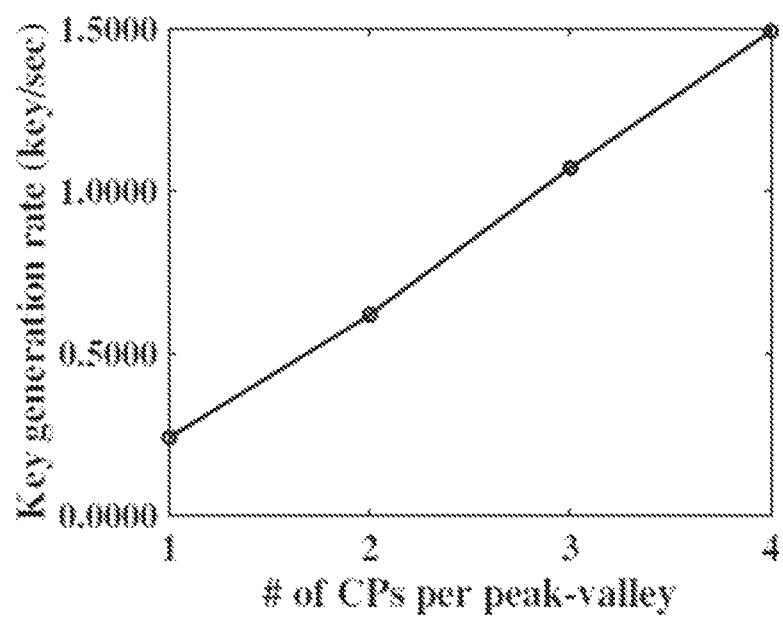
FIG. 15c shows a graph of the impact of synchronization on the number of CP per Peak-Valley versus the key generation rate.
Figure 15D:
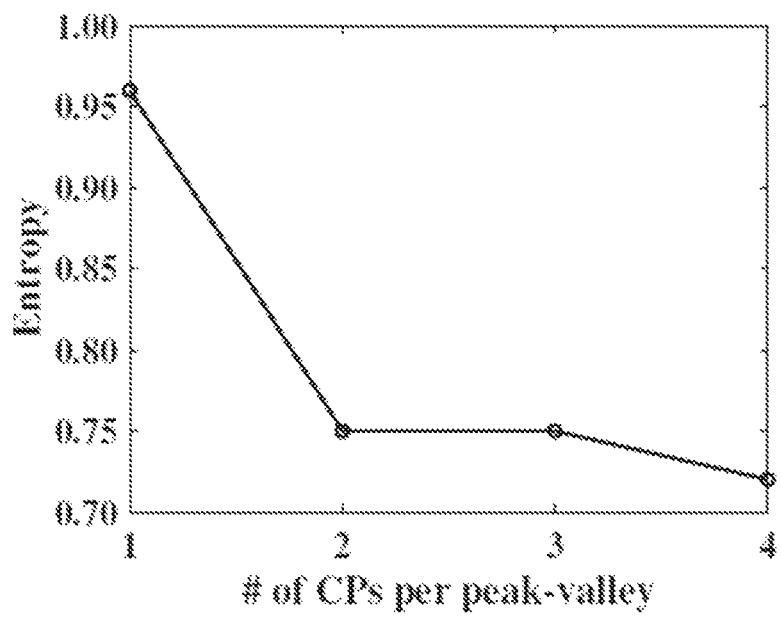
FIG. 15d shows a graph of the impact of synchronization on the number of CP per Peak-Valley versus entropy.
Figure 15E:
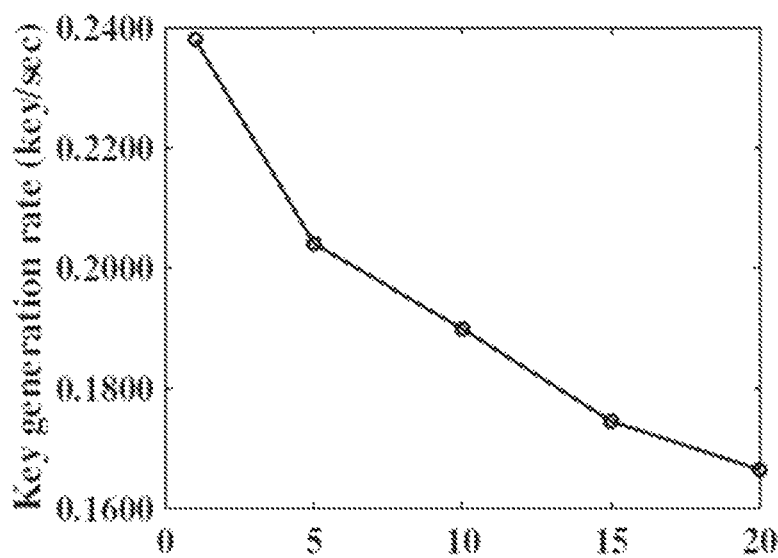
FIG. 15e shows a graph of the impact of synchronization on the CPD threshold versus the key generation rate.
Figure 15F:
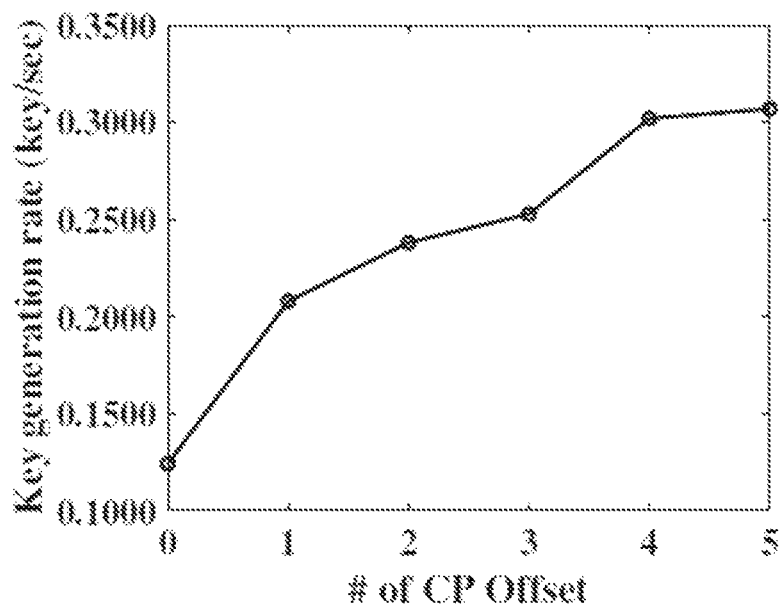
FIG. 15f shows a graph of the impact of synchronization on the CP offset versus the key generation rate.
Figure 15G:
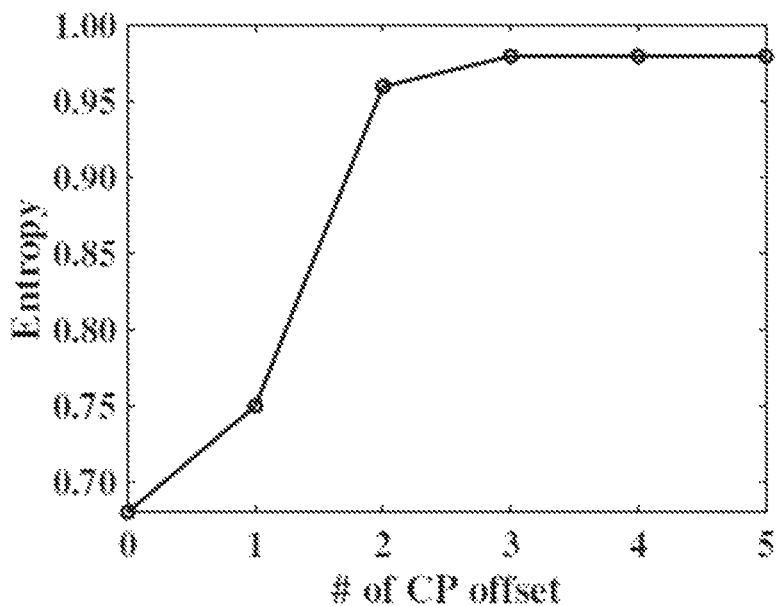
FIG. 15g shows a graph of the impact of synchronization on the CP offset versus entropy.
Figure 15H:
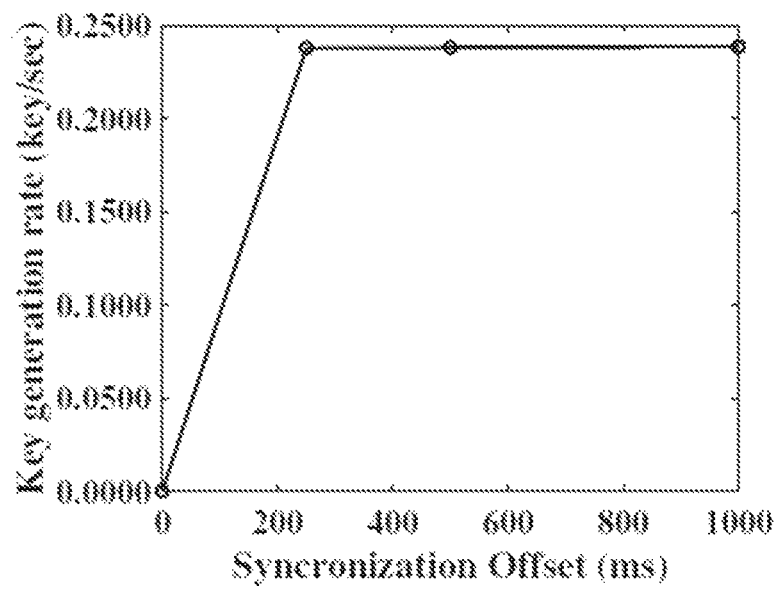
FIG. 15h shows a graph of the impact of synchronization on the synchronization offset versus the key generation rate.
Figure 15I:
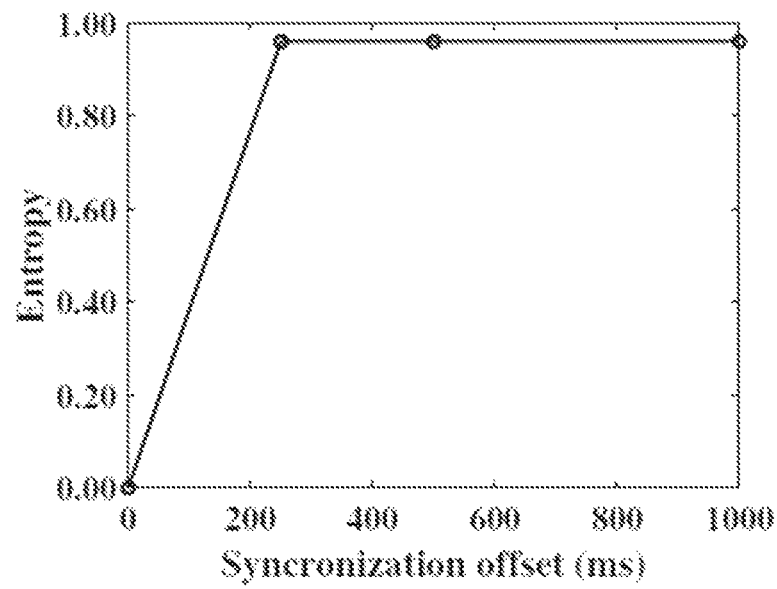
FIG. 15i shows a graph of the impact of synchronization on the synchronization offset versus entropy.

By changing the CPD threshold, the number of change points cannot be controlled. Increasing the CPD threshold leads to the loss of some possible synchronization points. Therefore, the KGR will decrease, as shown in FIG. 15e. However, it reduces the chance of the adversary generating a common key.

CP Offset

Another important parameter for synchronization is the offset of change points, which is the number of CPs adjacent to the selected CP that are allowed to be considered as an alternative to the selected CP. This is denoted as $n_{offset}$. A non-zero offset allows for inconsistency between change point detection on the two devices. For example, if one device misses a change point, future pairing attempts can be based on change points that are out of sync. The parameter $n_{offset}$ specifies the number of neighboring change points are used for pairing attempts. A value of 1 for $n_{offset}$ means that both the previous and the next change point are used for pairing attempts. FIGS. 10f and 10g show that increasing the CP offset Number can significantly increase the KGR and entropy.

Synchronization Offset

In order to have more control over the synchronization and pairing process, the synchronization offset was also parameterized. This parameter specifies how much lag or lead between two signals is accepted. This can be checked at the confirmation stage by sending the CP's index in which the common key has been generated. Using the generated key, DevB encrypts its CP's index and sends it to DevA. DevA decrypts it and checks whether it is within the range of the synchronization offset. If it is, DevA will accept the key as a shared key. Experimental results in the FIGS. 10h and 10i show that increasing this parameter until 250 msec can significantly raise the KGR and entropy. Increasing the synchronization offset beyond 250 msec will only increase the attacker's success rate.

Impact of Quantization

Figure 16A:
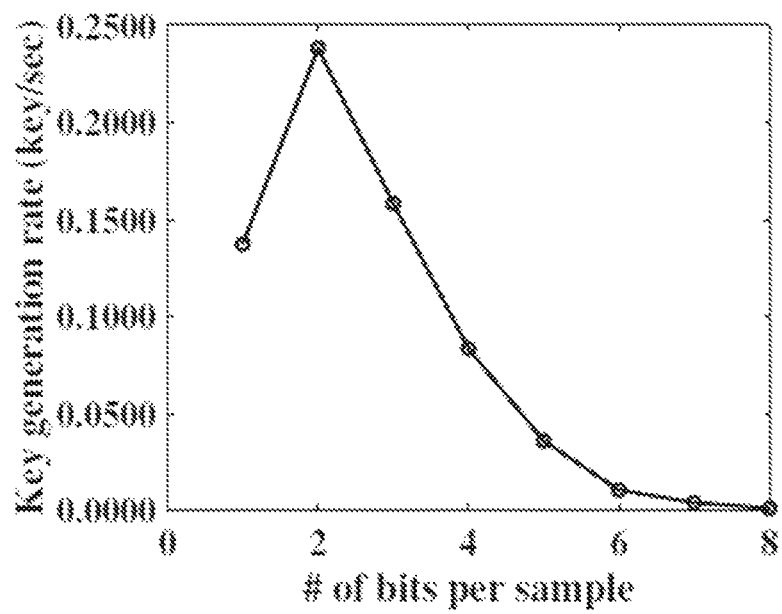
FIG. 16a shows a graph of the impact of quantization on the number of bits per sample versus the key generation rate.
Figure 16B:
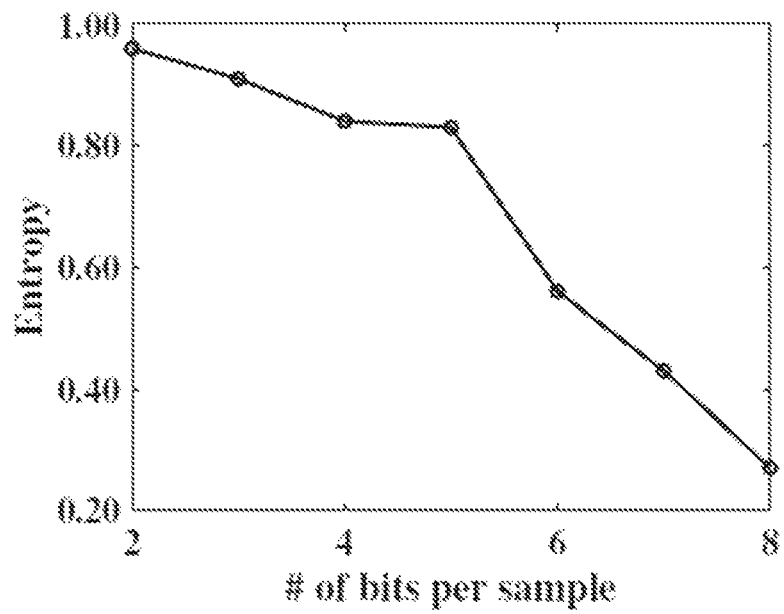
FIG. 16b shows a graph of the impact of quantization on the number of bits per sample versus entropy.
Figure 16C:
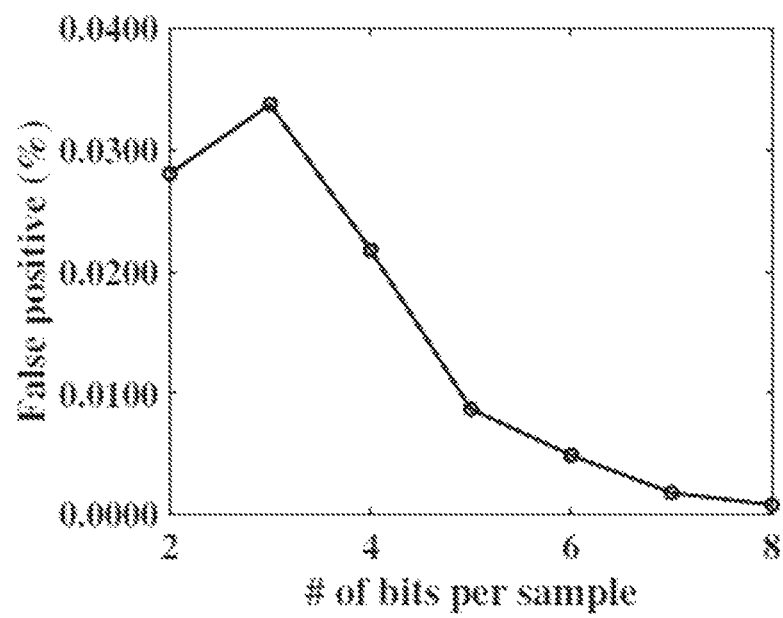
FIG. 16c shows a graph of the impact of quantization on the number of bits per sample versus the false positive ratio.
Figure 16D:
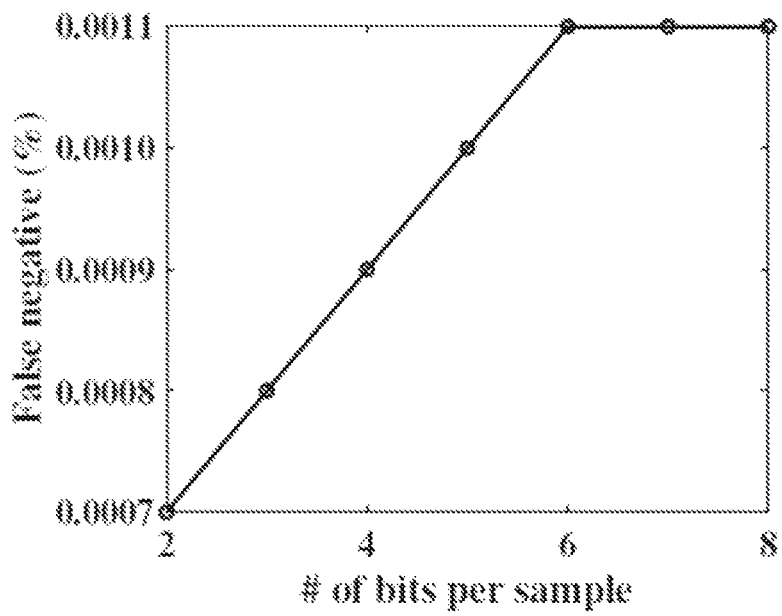
FIG. 16d shows a graph of the impact of quantization on the number of bits per sample versus the false negative ratio.

To examine the impact of quantization, the number of bits per sample was varied and the bit representation type was also examined. FIG. 16a shows that the key generation rate decreases when the number of bits per sample increases. The maximal key generation rate is achieved at 2 bits per sample. FIG. 16b shows the decrease in entropy when the number of bits per sample increases. The decrease is because fewer samples are needed to generate a key of a fixed length and because consecutive samples generally generate key bits with less randomness. FIG. 16d shows that the false positive rate increases with the number of bits per sample. More bits per sample leads to more quantization levels and, in turn, to a reduction of the distance between two successive quantization levels. As expected, an increase of the number of bits per sample leads there to be less tolerance of the sensing noise or other differences caused by the different sensing mechanisms in the devices. The drop in the false positive rate shown in FIG. 16c is simply because the fewer samples required to generate a key can increase the chance of false positives. Both FIG. 16c and FIG. 16d show that false positive and false negative rates are less than 0.04% and 0.0011% respectively.

Figure 16E:
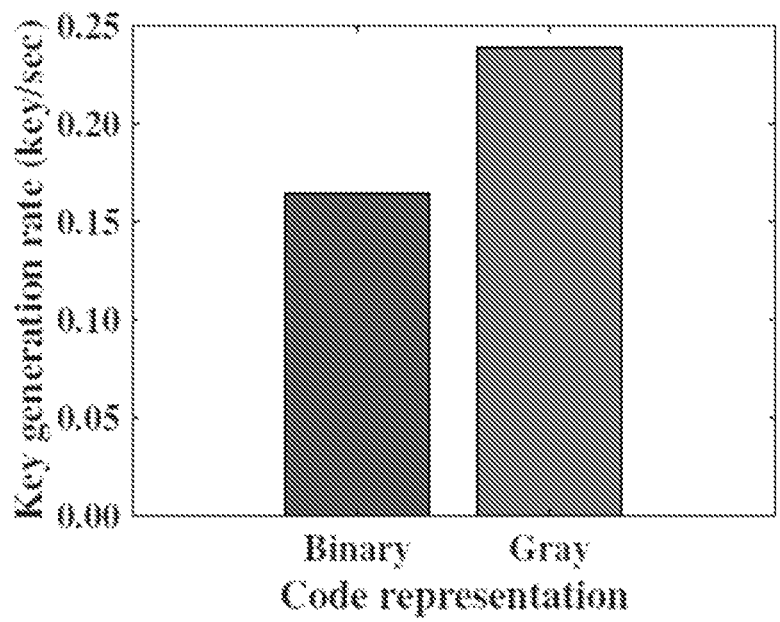
FIG. 16e shows a bar chart of the impact of quantization on the code representation type versus the key generation rate.
Figure 16F:
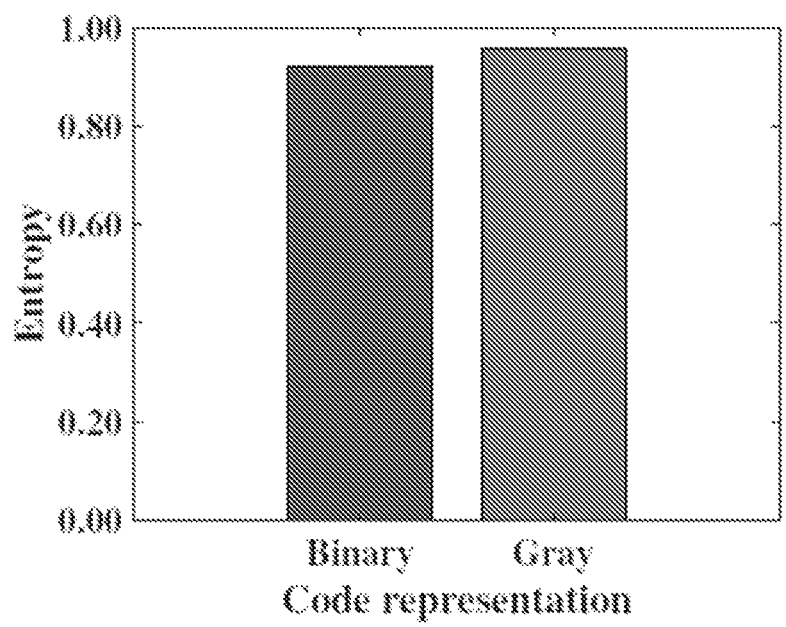
FIG. 16f shows a bar chart of the impact of quantization on the code representation type versus entropy.

FIG. 16e and FIG. 16f compare the results for Gray coding and binary coding used to represent bits generated by the quantizer. FIG. 16e shows that Gray coding can achieve higher key-generation rates than binary coding. The advantage is mainly because of the error correction capabilities of Gray coding.

Impact of Mismatch Correction

A key parameter of the mismatch correction and conformation module is the error correction rate (ECR), defined as the ratio between the number of mismatches that can be corrected and the length of a codeword in bits. The method of the present invention uses BCH mainly to correct mismatches in key bits between two devices to be paired. Meaning that the error correction rate directly affects the key generation rate. For 127-bit codewords and 255-bit codewords, ECRs are in the ranges of between 0.79% and 24.4% and between 0.39% and 24.7%, respectively.

Figure 17A:
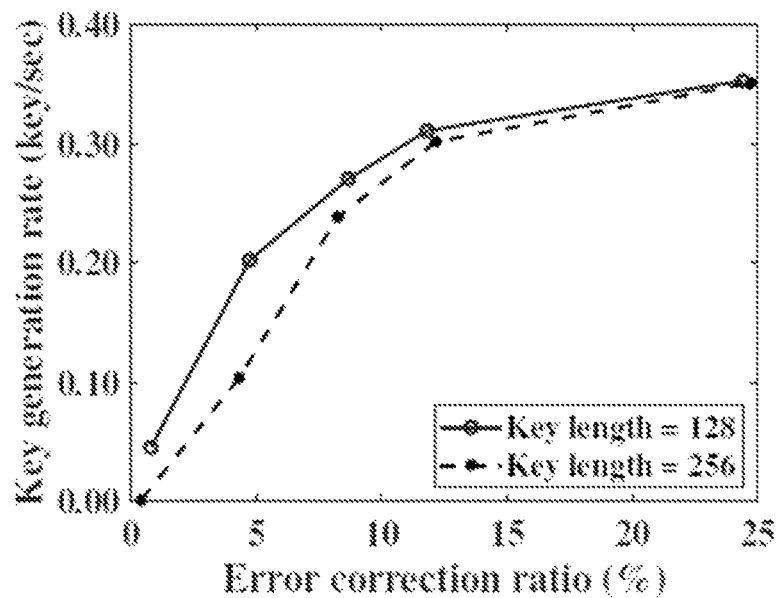
FIG. 17a shows a graph of the impact of mismatch correction on the correction ratio versus the key generation rate.
Figure 17B:
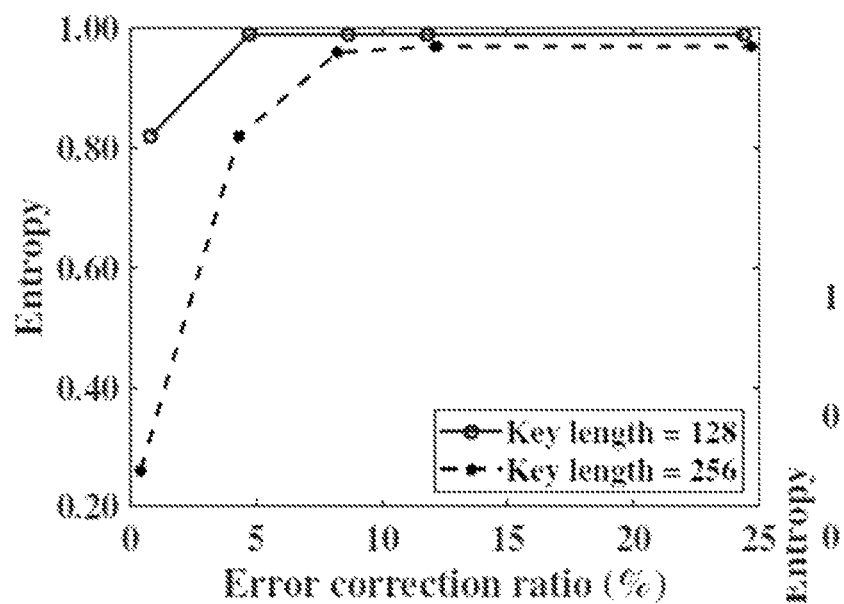
FIG. 17b shows a graph of the impact of mismatch correction on the correction ratio versus entropy.
Figure 17C:
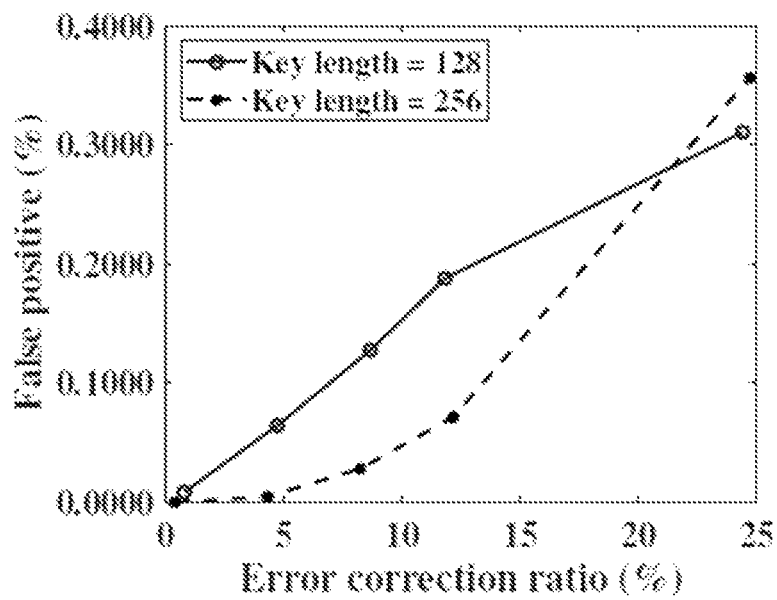
FIG. 17c shows a graph of the impact of mismatch correction on the correction ratio versus the false positive ratio.
Figure 17D:
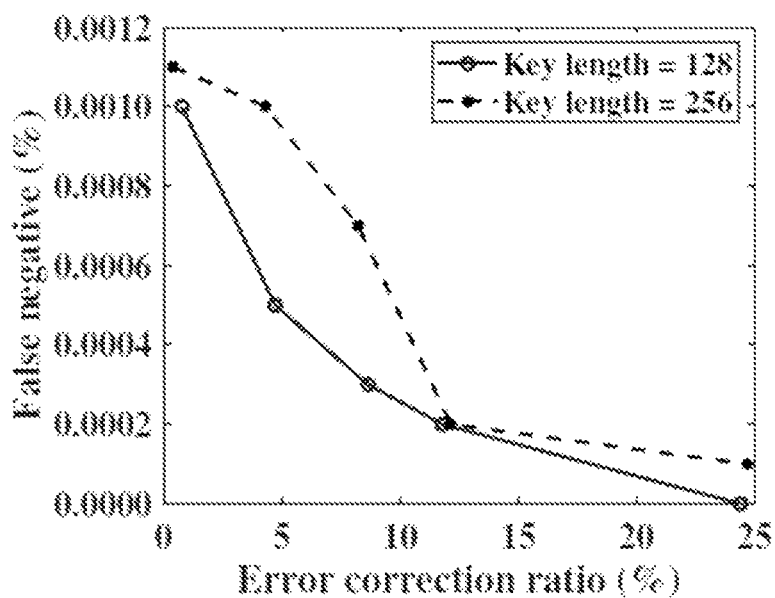
FIG. 17d shows a graph of the impact of mismatch correction on the correction ratio versus the false negative ratio.

As expected, the key generation rates, shown in FIG. 17a, increase with ECR simply because more bit mismatches can be resolved when ECR increases. The low key-generation rates for both 128-bit and 256-bit keys when ECR<1% indicate that the mismatches are very unlikely to be removed completely with low-ECR BCH codes. FIG. 17b shows that the protocol of the present invention can generate 128-bit keys and 256-bit keys with entropy close to 1, the ideal entropy, when ECR 5% and ECR 8%, respectively. FIG. 17d shows the decrease of false-negative rate when ECR increases. This decrease is consistent as larger ECR can resolve more bit mismatches. The cost of the decrease of false-negative rate is the increase of false-positive rate, shown in FIG. 17c. In other words, the increase of ECR can also possibly increase the number of false-positives because more bit mismatches can be resolved even for respiration signals not collected from the same body.

Since bitstring selection is based on the CPs, the KGR relies on the number of CPs, meaning that the more CPs in a specific signal duration, the higher the KGR. On the other hand, using band-pass and Savitzky-Golay filters, the present invention achieves relatively smooth signals with some mismatches that can be corrected in the mismatch correction step. Hence, although increasing the key length can decrease the KGR in principle, the effect in practice is not significant, as exemplified in FIG. 8. Using low frequency biometric activities brings fundamental trade-offs between the key generation rate and the key length. For example, for breathing sensors with a sample rate of 64 Hz, a low frequency respiration signal (around 0.35 Hz), and a quantizer that represents each sample with 2 bits, key lengths lower than 128 bits cannot have a high entropy rate. This is because the keys are generated from a small number of samples (there are 128 bits per second, which makes for about one-third of a respiration cycle). Also, key lengths greater than 256 bits may have significant overlap with consecutive keys. For instance, a key length of 1024 bits covers around three respiration cycles, which has at least six CPs.

Resistance to Attacks

Figure 19:
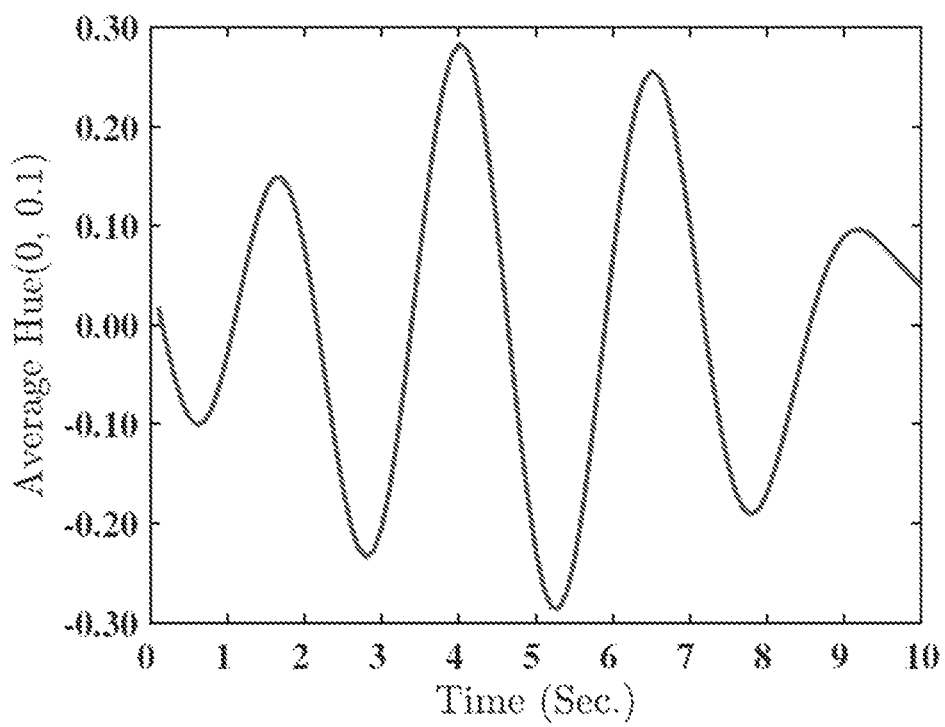
FIG. 19 shows a graph of a detected respiration signal.

The proposed method, for each video frame, detects the user's face and facial landmarks using the histogram of oriented gradients (HoG) features with the help of a support vector machine (SVM). Then, the method determines the region of interest (ROI), which is a part of the user's forehead, based on the facial landmarks. Afterward, it converts the frame to hue saturation value (HSV) color space and calculates the average hue of all ROI pixels. The variation in the average values is due to the heartbeat, respiration, and changes in ambient light. A band-pass filter with a cut-off frequency in the respiration frequency range (0:1 Hz; 0:5 Hz) is applied on the array of the average values to extract the respiration signals, as shown in FIG. 19. Based on the extracted respiration signal, the adversary can launch the impersonation attack to pair with a legitimate device attached to the victim.

The experiments utilized a video camera of resolution 640*480 pixels and capture rate of 30 RGB frames per second is used to take a video of the user's face. Since the method extracts the respiration signal in real-time, it loses some frames due to the processing time. The results showed that the method can process nine frames per second to extract respiration signals. Hence, the extracted signal will lose some information of the actual respiration signal. The extracted signals are also affected by ambient light and the tone of the user's skin color.

Figure 18:
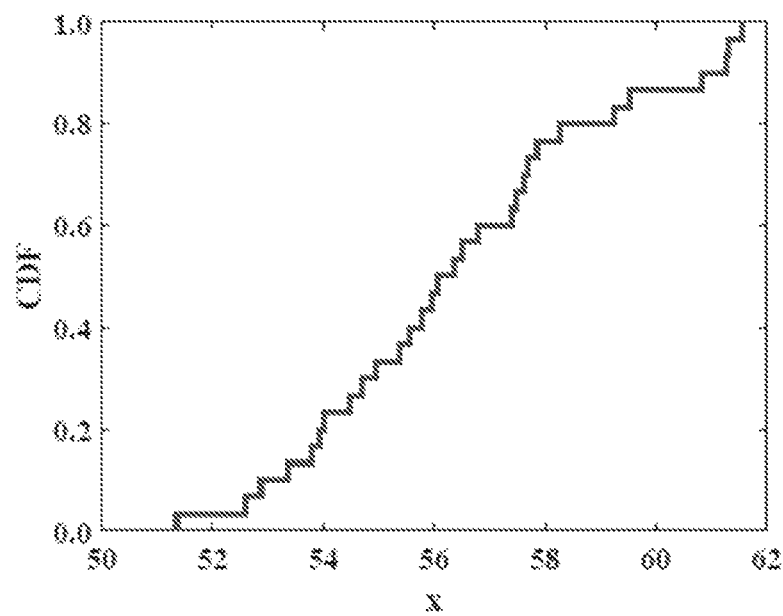
FIG. 18 shows a graph of the CDF of the bit agreement rate.

The results showed that the false-negative rate of this impersonation attack is zero. This means that the adversary cannot generate a shared key. To find out how close the adversary is to a successful pairing with a legitimate device with this impersonation attack, the bit agreement rate was measured, which represents the percentage of matched key bits. As shown in FIG. 18, the maximal bit agreement rate is 61.56%. This is because the extracted signal from the user's video cannot preserve the original signal's features, such as change points. Hence, the signal generated for the impersonation attack cannot be synchronized to the victim's signal. The loss of synchronization causes lots of mismatches that the mismatch correction method cannot correct.

Example 2. Cross-Modal Pairing

The devices used for the performance evaluation were a Hexoskin® smart shirt and a Samsung Galaxy Watch 3 while doing an exercise on an Expresso GO Upright cycle ergometer. The Hexoskin® smart shirt integrates a breathing sensor based on the respiratory inductive plethysmography (RIP) technology. The RIP sensor, consisting of two belts of sinusoid wire coils positioned around the thorax and abdomen, detects expansion and compression of the abdomen and the rib cage due to changes in the lung's air volume during respiration cycles and converts it to a digital signal, the amplitude of which is proportional to the respiratory volume. The Hexoskin® shirt provides both respiratory signals and VE data. The Samsung Galaxy Watch 3 is equipped with a PPG sensor capable of capturing cardiac signals. The sampling frequencies of the RIP sensor and the PPG sensor are 128 Hz and 25 Hz respectively.

Data was collected from 30 participants including 16 males and 14 females, with a mean age of 31.5 years (ranging from 18 to 56 years). Participants wore the Hexoskin® smart shirt and Samsung Galaxy Watch 3. Participants were asked to do incremental exercises using the Expresso GO Upright cycle ergometer. The pedaling frequency was set at 60±5 revolutions per minute (rpm) by the participants. The incremental exercises included four minutes of rest, four minutes of cycling at an intensity of 50 W, and four minutes of cycling at an intensity of 80 W.

The key metrics used to evaluate the performance of the pairing protocol are listed as follows: (1) Key generation rate (KGR): The metric is defined as the number of keys generated per second. Usually, a higher key generation rate is desired. (2) Entropy: To counter guessing attacks by an adversary, the generated keys should contain enough uncertainty. The uncertainty was measured as entropy defined as follows: $H(W)=-P(w0)\log 2P(w0)-P(w1)\log 2P(w1)$, where W denotes a randomly generated key, $P(w0)$ and $P(w1)$ are the probability of zeros and ones in W, respectively. The maximum uncertainty is achieved when the entropy is equal to one. (3) Bit agreement ratio (BAR) is defined as the percentage of matched bits of the corresponding bit-strings generated by the two devices. The metric was used to measure how close an adversary must be to pair with a legitimate device. In other words, the metric was used to measure resistance of the pairing protocol to impersonation attacks.

Impact of Parameters and Methods Choices

Table VII lists the typical parameters used during the experiments. The impact of a parameter of interest was studied by varying the parameter of interest and keeping the other parameters constant.

TABLE VII

Typical Parameters for Experimental Observation

| Parameter | Value |
| --- | --- |
| BCH parameters (N, K) | (127, 57) |
| Number of bits per sample | 2 |
| Estimation model | Exponential |
| Model parameter a | 1.16 |
| Model parameter $b_1$ | 0.021 |
| Quantization Window size w | 64 |
| Switching buffer $n_b$ | 32 |
| Switching threshold $\delta_S$ | 17 |

Impact of Switching (Extraction/Modeling)

The performance gain brought by the switching between the model-based pairing and the extraction-based pairing was first studied by examining each pairing method individually. As shown in Table VIII, both pairing methods can generate keys at a rate between 0.0046 and 0.0125 keys per second with key entropy close to 1, the ideal entropy. The KGR increases with intensity level for the model-based pairing and decreases for the extraction-based pairing when the intensity level increases. The results indicate switching between the two pairing methods provides for better pairing performance. CMP switches the pairing modes based on the average respiration rate calculated from samples in a buffer. When the average respiration rate is above the switching threshold, the device will be working in the model-based pairing mode. Otherwise, the device will work in the extraction-based pairing mode.

TABLE VIII

Extraction-based and Model-based Pairing Performance

| Pairing Mode Intensity level | Extraction-based | | Model-based | |
| --- | --- | --- | --- | --- |
| | KGR (key/sec) | Entropy | KGR (key/sec) | Entropy |
| Resting | 0.0077 | 0.99 | 0.0052 | 0.97 |
| Moderate Intensity | 0.0065 | 0.99 | 0.0113 | 0.99 |
| High Intensity | 0.0046 | 0.98 | 0.0125 | 0.99 |

Figure 20:
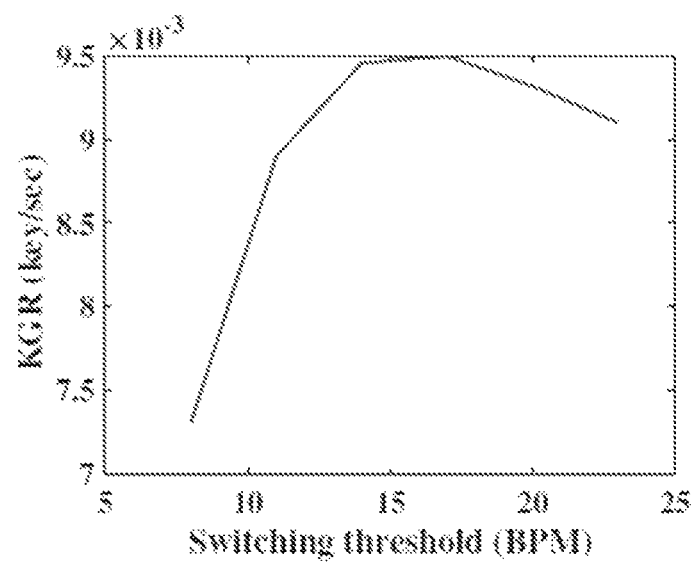
FIG. 20 shows a graph of the impact of adjusting the switching threshold based upon breathing rate on the key generation rate.
Figure 21:
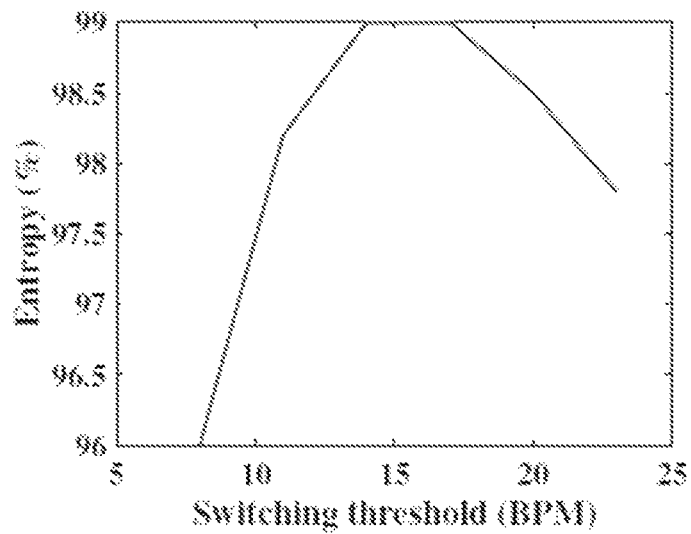
FIG. 21 shows a graph of the impact of adjusting the switching threshold based upon breathing rate on the entropy.

Further experiments evaluated the two switching parameters: the buffer size and the switching threshold. As shown in FIGS. 20 and 21, The results showed that the pairing performance does not change significantly when the switching threshold is between 12 and 20 BPM(breaths per minute), which is within the range of normal breathing. Table IX shows the pairing performance with different buffer sizes. A larger buffer size can average out more fluctuation caused by sensing noise and lead to increased agreement between the two devices to be paired. A larger buffer size can result in better pairing performance. Notably, switching enabled CMP outperformed the individual pairing methods, as demonstrated by Table IX relative to Table VIII.

TABLE IX

Impact of Buffer Size

| Buffer size Intensity level | 16 samples | | 32 samples | |
| --- | --- | --- | --- | --- |
| | KGR (key/sec) | Entropy | KGR (key/sec) | Entropy |
| Resting | 0.0061 | 0.99 | 0.0077 | 0.99 |
| Moderate Intensity | 0.0107 | 0.99 | 0.0113 | 0.99 |
| High Intensity | 0.0125 | 0.99 | 0.0125 | 0.99 |

Impact of Quantization

The key quantization parameter is the number of bits allocated for each sample. On one hand, more bits allocated for each sample can lead to higher KGR. On the other hand, more bits allocated for each sample are more likely to result in bit differences between two devices to be paired. In this set of experiments, the number of bits per sample were varied and different combinations of bits for pairing were tested. Table X shows that if all bits are included for pairing, both KGR and entropy decrease when the number of bits allocated for each sample increases. When more than eight bits are allocated for each sample, CMP cannot achieve pairing because of too many bit differences in the generated keys. The Lloyd-Max quantizer was compared with the uniform quantizer in terms of the pairing performance. As shown in Table X, the performance of Lloyd-Max quantizer is much higher than the uniform quantizer.

TABLE X

The Effect of the Number of Bits on Pairing Performance

| Bit selection | # of bits | 2 | 4 | 8 | 16 |
| --- | --- | --- | --- | --- | --- |
| All bits | KGR | 0.0104 | 0.0027 | 0 | 0 |
| | Entropy | 0.99 | 0.97 | 0 | 0 |
| All bits- | KGR | 0.0079 | 0.0029 | 0 | 0 |
| Uniform | Entropy | 0.58 | 0.95 | 0 | 0 |

Impact of Mismatch Correction

Figure 22:
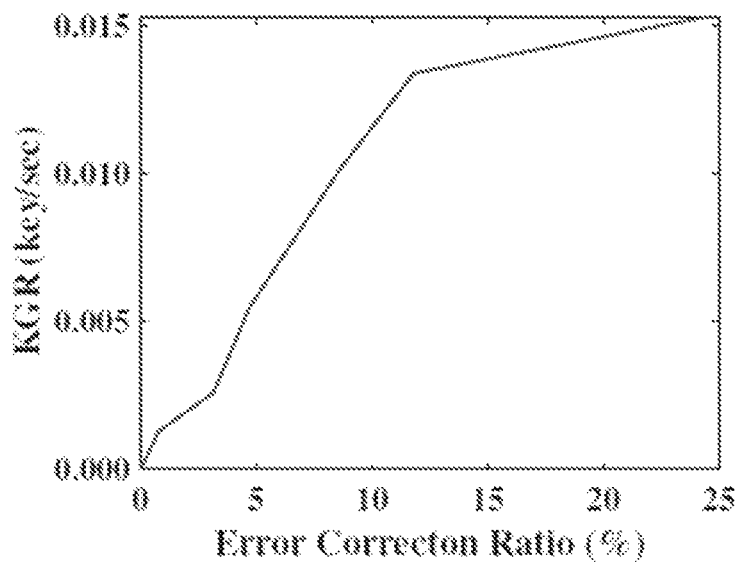
FIG. 22 shows a graph of the impact of adjusting the error correction ratio on the key generation rate.
Figure 23:
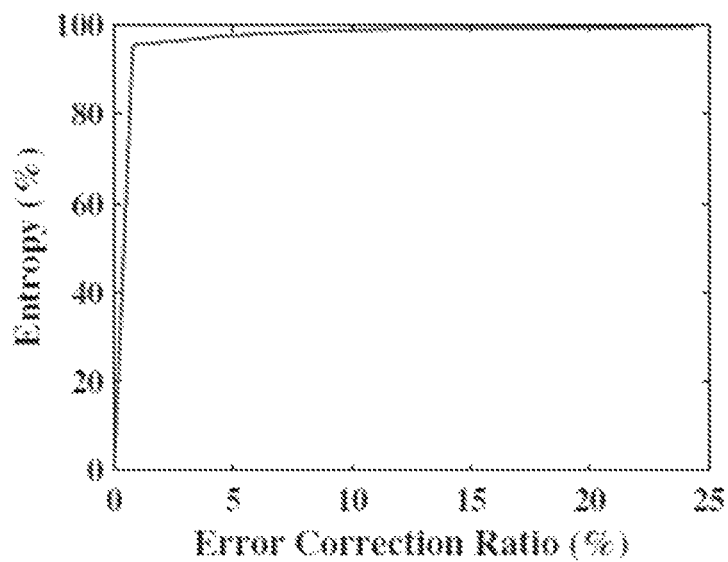
FIG. 23 shows a graph of the impact of adjusting the error correction ratio on the entropy.

As discussed in Example 1, the key parameter of the mismatch correction is the error correction rate. The error correction rate was varied from 0% to 24.4%. As shown in FIG. 22, the KGR increases with the error correction rate as a larger error correction rate leads to more mismatch corrections, and in turn, more keys. FIG. 23 shows that the entropy is close to 1, the perfect entropy when the error correct rate is larger than 5.5%. An error correction rate lower than 3.1% is very unlikely to correct all the bit mismatches.

Resistance to Impersonation Attacks

Figure 24:
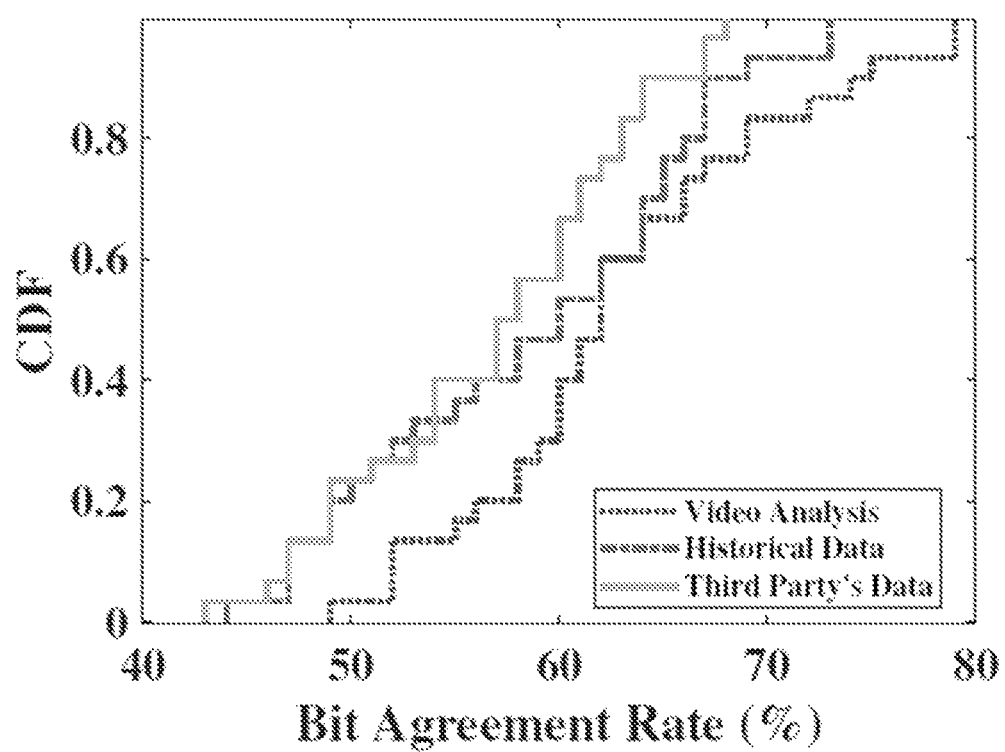
FIG. 24 shows a graph of the CDF of bit agreement rate for different impersonation attacks.

An adversary may try to compromise pairing with the CMP protocol with impersonation attacks based upon a third party's data, with historic data, or with video analysis. CMP's resistance to these impersonation attacks was evaluated using an error correction rate of the mismatch correction set to 8.6%. The results of three types of impersonation attacks are shown in FIG. 24.

In some experiments, it was assumed that an adversary can obtain a third party's respiratory signals and use the respiratory signals to pair with a legitimate device attempting the pairing with cardiac signals from a victim. Results utilizing this assumption showed that the adversary cannot succeed with the attack. The highest bit agreement rate that the adversary achieved was less than 68.1%.

In some experiments, it was assumed that an adversary possessed the victim's previous respiratory or cardiac data and use the data to pair with a legitimate device attached to the victim. To evaluate the resistance to the impersonation attack, the record data of each participant was used to attempt pairing. Results utilizing this assumption showed that the adversary cannot obtain a key with this attack and the highest bit agreement rate was 73%. In comparison with the impersonation attack with a third party's data, the attack with historical data can achieve a higher best bit agreement rate since the recorded data is from the same victim.

A third vector an adversary may use is extracting respiratory and heartbeat signals from a video of a user's face by detecting and processing imaging Photoplethysmographic (iPPG) signals. Therefore, it is assumed that the adversary is able to extract a victim's respiratory or cardiac signal through video analysis. To evaluate the attack, we replicated the method described in Example 1. The method extracts the fluctuations of use's forehead hue, convert it to frequency domain, and consider the highest frequency in the normal heart and respiration frequency as HR and RR, respectively. In these experiments, a laptop web cam was used to detect a subject's HR and RR based on the video of his/her face when he/she is cycling on a stationary bike. According to the results, this method can estimate RR with an average of 8.95% estimation error. Heart rate was detected with a higher accuracy (around 95%) close to the HR calculated by the PPG signal. Notably, this method cannot estimate RSA from the detected cardiac signal as it cannot generate an accurate cardiac signal in the time domain. The impersonation attack with video analysis can achieve a higher BAR than the previous attacks mainly because of the synchronization between the attack device and the victim's device due to real-time signal extraction from the facial images of the attack. This attack still cannot form a key with the victim's device due to various reasons such as ambient light change and user's motion. The highest BAR achieved using this method was below 80%.

Power Consumption and Processing Time

The usability of the CMP protocol with respect to processing time and power consumption was investigated since the pairing protocol is designed for wearable devices known for various resource constraints.

In this set of experiments, PowerTutor, a widely accepted open-source application, was used to measure the energy consumption and processing time for each paring attempt on two devices. A Sony Xperia XA Ultra F3213 and an HTC One E9 Plus. Each devices utilized an android application that loads users' respiratory or cardiac dataset collected by the smart shirt and smartwatch and runs the CMP protocol.

Table XI shows the results of power consumption and processing time of CMP. The most power-consuming step is the BCH error correction and confirmation step as it requires the most computational complexity. Further, the results in Table IX show, in the worst case, CMP needs 351 milliseconds (ms) and 103 millijoules (mJ) for each pairing attempt. On average, 1.35 pairing attempts are needed to generate a secure shared key. Therefore, the power consumption per key 137.7 mJ. If a user intends to generate a key every 5 minutes using the CMP protocol, a total of 1652 mJ is needed per hour. Thus, CMP consumes about 0.1% of the battery capacity in 24 hours considering that the HTC One E9 Plus includes a battery capacity of approximately $3.8 \times 10^7$ mJ/H.

TABLE XI

Processing Time and Energy Consumption for Pairing

| Pairing mode | Processing Time (ms) | | Energy Consumption (mJ) | |
|---|---|---|---|---|
| | Extraction based (resting) | Model based (exercise) | Extraction based (resting) | Model based (exercise) |
| Preprocessing | 69 | 69 | 20 | 20 |
| RR Extraction | 39 | 39 | 12 | 12 |
| VĖ estimation | 0 | 13 | 0 | 4 |
| Derivative Calculation | 16 | 0 | 5 | 0 |
| Lloyd-Max quantization | 56 | 56 | 16 | 16 |
| Error Correction | 171 | 171 | 50 | 50 |
| All steps | 351 | 348 | 103 | 102 |

It will be clear to one skilled in the art that the above embodiments may be altered in many ways without departing from the scope of the invention.

What is claimed is:

1. A method of pairing two user worn devices comprising:
   collecting a first variable biometric activity from a first device utilizing a first sensing mechanism to create a first biometric signal;
   collecting a second variable biometric activity from a second device utilizing a second sensing mechanism to create a second biometric signal;
   processing the first biometric signal to create a first key;
   processing the second biometric signal to create a second key; and
   determining if the first key matches the second key to allow said first device to pair with said second device.

2. The method of claim 1, wherein the first variable biometric activity is different from the second variable biometric activity.

3. The method of claim 2, the method further comprising the step of:
   determining an activity level based upon either the first biometric signal and the second biometric signal relative to reference values associated with the corresponding first variable biometric activity and second variable biometric activity.

4. The method of claim 3, the method further comprising the steps of:
   selecting a model-based processing mode if the activity level is at a threshold value or greater, and
   selecting an extraction-based processing mode if the activity level is less than the threshold value.

5. The method of claim 4, wherein the step of processing the first biometric signal to create a first key according to the model-based processing mode includes the sub-steps of:
   i. pre-processing the first biometric signal;
   ii. quantizing the first biometric signal;
   iii. performing mismatch correction of the first biometric signal; and
   iv. generating the first key.

6. The method of claim 5, wherein the step of processing the second biometric signal to create a second key according to the model-based processing mode includes the sub-steps of:
   i. pre-processing the second biometric signal;
   ii. quantizing the second biometric signal;
   iii. performing mismatch correction of the second biometric signal; and
   iv. generating the second key.

7. The method of claim 6, wherein the first biometric signal is a respiratory signal, wherein the second biometric signal is a cardiac signal, and wherein the sub-step of pre-processing the second biometric signal includes calculating an estimated respiratory signal.

8. The method of claim 4, wherein the activity level is less than the threshold and the steps of processing the first biometric signal to create a first key and the step of procession the second biometric signal to create a second key are model-based, and wherein the model-based step of processing the first biometric signal to create a first key includes the sub-steps of:
   i. pre-processing the first biometric signal;
   ii. quantizing the first biometric signal;
   iii. performing mismatch correction of the first biometric signal; and
   iv. generating the first key.

9. The method of claim 8, wherein the extraction-based step of processing the second biometric signal to create a second key includes the sub-steps of:
   i. pre-processing the second biometric signal;
   ii. extracting a first biometric signal proxy from the second biometric signal;
   iii. calculating a first derivative of the first biometric signal proxy;
   iv. optionally, calculating a second derivative of the first biometric signal proxy;
   v. quantizing the extracted first biometric signal proxy;
   vi. performing mismatch correction of the extracted first biometric signal proxy; and
   vii. generating the second key.

10. The method of claim 9, wherein the first biometric signal is a respiratory signal, wherein the second biometric signal is a cardiac signal, and wherein the sub-step of extracting a first biometric signal proxy from the second biometric signal includes extracting a respiratory signal proxy from the cardiac signal.

11. The method of claim 2, wherein the first variable biometric activity and the second variable biometric activity are selected from the group consisting of electrocardiogram (ECG), electromyography (EMG), electroencephalogram (EEG), electrooculogram (EOG), functional near-infrared spectroscopy (fNIRS), photoplethysmogram (PPG), magnetoencephalogram (MEG), respiratory signals, impedance pneumography, respiratory inductance plethysmography (RIP), and galvanic skin response (GSR).

12. The method of claim 1, wherein the first variable biometric activity is the same as the second variable biometric activity.

13. The method of claim 12, wherein said step of processing the first biometric signal includes the sub-steps of:
   i. pre-processing the first biometric signal;
   ii. quantizing the first biometric signal;
   iii. synchronizing the first biometric signal;
   iv. performing mismatch correction of the first biometric signal; and
   v. generating the first key.

14. The method of claim 13, wherein said step of processing the second biometric signal includes the sub-steps of:
   i. pre-processing the second biometric signal;
   ii. quantizing the second biometric signal;
   iii. synchronizing the second biometric signal;
   iv. performing mismatch correction of the second biometric signal; and
   v. generating the second key.

15. The method of claim 14, wherein said first biometric signal has a first sample frequency, a first signal amplitude, and set of first noise characteristics; and wherein said second biometric signal has a second sample frequency, a second signal amplitude, and a set of second noise characteristics.

16. The method of claim 15, wherein the sub-step of pre-processing the first biometric signal further includes:
   down-sampling the first sample frequency;
   normalizing of the first signal amplitude; and
   filtering of the first set of noise characteristics.

17. The method of claim 16, wherein the sub-step of pre-processing the second biometric signal further includes:
   down-sampling the second ample frequency;
   normalizing of the second signal amplitude; and
   filtering of the second set of noise characteristics.

18. The method of claim 14, wherein the steps of processing the first biometric signal and the step of processing the second biometric signal each further includes sub-steps of:
   segmenting said first biometric signal and said second biometric signal to create a segmented first biometric signal and a segmented second biometric signal;
   wherein the step of generating the first key includes selecting certain segments of the segmented first biometric signal; and
   wherein the step of generating the second key includes selecting certain segments of the segmented second biometric signal.

19. The method of claim 1, wherein the first sensing mechanism is selected from the group consisting of respiratory inductance plethysmography (RIP); accelerometer, anemometers, thermistors, thermocouples, pyroelectric detectors, fiber optic sensors, capacitive sensors, resistive sensors, microphones, nanocrystal and nanoparticles sensors; and wherein the second sensing mechanism is different or the same than the first sensing mechanism and is selected from the group consisting of respiratory inductance plethysmography (RIP); accelerometer, anemometers, thermistors, thermocouples, pyroelectric detectors, fiber optic sensors, capacitive sensors, resistive sensors, microphones, nanocrystal and nanoparticles sensors.

20. The method of claim 1, wherein the steps of processing the first biometric signal to create a first key further includes:
   performing mismatch correction of the first biometric signal according to a modified BCH protocol; and
   wherein processing the second biometric signal to create a second key each further includes:
   performing mismatch correction of the second biometric signal according to the modified BCH protocol.

* * * * *